(12) United States Patent  
Woodgate et al.

(10) Patent No.: US 7,215,475 B2  
(45) Date of Patent: May 8, 2007

(54) LENS ARRAY STRUCTURE

(75) Inventors: Graham John Woodgate, Henley-on-Thames (GB); Jonathan Harrold, Warwick (GB)

(73) Assignee: Ocuity Limited, Oxfordshire (GB)

( * ) Notice: Subject to any disclaimer, the term of this patent is extended or adjusted under 35 U.S.C. 154(b) by 0 days.

(21) Appl. No.: 10/563,118

(22) PCT Filed: Jul. 9, 2004

(86) PCT No.: PCT/GB2004/002984

§ 371 (c)(1),
(2), (4) Date: Jan. 3, 2006

(87) PCT Pub. No.: WO2005/006774

PCT Pub. Date: Jan. 20, 2005

(65) Prior Publication Data

US 2006/0152812 A1    Jul. 13, 2006

(30) Foreign Application Priority Data

Jul. 10, 2003   (GB) ................................ 0316222.9

(51) Int. Cl.
*G02B 27/10* (2006.01)
*G02F 1/1335* (2006.01)
*G03B 35/00* (2006.01)
*H04N 15/00* (2006.01)

(52) U.S. Cl. ........................ 359/624; 359/622; 348/51; 349/15; 396/324

(58) Field of Classification Search .................. 348/51; 349/15; 359/464, 621, 622, 623, 624; 396/324
See application file for complete search history.

(56) References Cited

U.S. PATENT DOCUMENTS 3,858,001 A    12/1974    Bonne (Continued)

FOREIGN PATENT DOCUMENTS

EP    0 721 131 A2    7/1996

(Continued)

OTHER PUBLICATIONS

U.S. Appl. No. 10/485,357, filed Feb. 27, 2004, Graham John Woodgate et al.

(Continued)

Primary Examiner—David N. Spector
(74) Attorney, Agent, or Firm—Foley & Lardner LLP

(57) ABSTRACT

A lens array structure comprises two birefringent lens arrays arranged in series, both being capable of operating to direct incident light of one polarisation into a respective directional distribution and to have substantially no effect on incident light of a polarisation perpendicular to said one polarisation. The lens arrays are relatively oriented such that incident light of two perpendicular polarisation components are directed into a directional distribution by a respective one of the birefringent lens arrays and not affected by other one of the birefringent lens arrays. Thus control of the polarisation allows switching between the effects of the two lens arrays. To allow switching into a third mode in which neither of the lens arrays has effect, one of the lens arrays may be active. The lens structure may be employed in a display apparatus to provide a switchable directional display.

12 Claims, 13 Drawing Sheets

U.S. PATENT DOCUMENTS

| | | | |
|---|---|---|---|
| 4,959,641 | A | 9/1990 | Bass et al. |
| 6,069,650 | A | 5/2000 | Battersby |
| 6,310,671 | B1 | 10/2001 | Larson |
| 7,058,252 | B2 * | 6/2006 | Woodgate et al. ............. 385/16 |
| 2006/0098296 | A1 * | 5/2006 | Woodgate et al. .......... 359/642 |
| 2006/0158511 | A1 * | 7/2006 | Harrold et al. ............... 348/51 |
| 2006/0164528 | A1 * | 7/2006 | Harrold et al. ............. 348/276 |
| 2006/0176541 | A1 * | 8/2006 | Woodgate et al. .......... 359/237 |

FOREIGN PATENT DOCUMENTS

| | | |
|---|---|---|
| EP | 0 829 744 A2 | 3/1998 |
| EP | 0 833 183 A1 | 4/1998 |
| EP | 1 197 766 A2 | 4/2002 |
| WO | WO 98/21620 | 5/1998 |
| WO | WO 03/015424 A2 | 2/2003 |

OTHER PUBLICATIONS

Berkel, Cees Van et al, "Multiview 3D-LCD", Proc of SPIE, vol. 2653, 1996, pp. 32-39.

Eichenlaub, Jesse B., "Developments in Autostereoscopic Technology at Dimension Technologies Inc.", Proc of SPIE, vol. 1915, 1993, pp. 177-186.

LG Commander et al., "Electrode Designs for Tunable Microlenses", Micolens Arrays, EOS Topical Meeting, 1997, vol. 13, pp. 48-58.

Okoshi, T., "Three -Dimensional Imaging Techniques", Academic Press, 1976.

Suyama, S. et al., "3-D Display System with Dual-Frequency Liquid-Crystal Varifocal Lens", SID 97 Digest, pp. 273-276.

* cited by examiner

LENS ARRAY STRUCTURE

The present invention relates to a display apparatus. Such an apparatus may be used in a switchable two dimensional (2D)/three dimensional (3D) autostereoscopic display apparatus; for a switchable high brightness reflective display system; for a multi-user display system; or for a directional lighting system. Such systems may be used in computer monitors, telecommunications handsets, digital cameras, laptop and desktop computers, games apparatuses, automotive and other mobile display applications.

Normal human vision is stereoscopic, that is each eye sees a slightly different image of the world. The brain fuses the two images (referred to as the stereo pair) to give the sensation of depth. Three dimensional stereoscopic displays replay a separate, generally planar, image to each of the eyes corresponding to that which would be seen if viewing a real world scene. The brain again fuses the stereo pair to give the appearance of depth in the image.

FIG. 1a shows in plan view a display surface in a display plane 1. A right eye 2 views a right eye homologous image point 3 on the display plane and a left eye 4 views a left eye homologous point 5 on the display plane to produce an apparent image point 6 perceived by the user behind the screen plane.

FIG. 1b shows in plan view a display surface in a display plane 1. A right eye 2 views a right eye homologous image point 7 on the display plane and a left eye 4 views a left eye homologous point 8 on the display plane to produce an apparent image point 9 in front of the screen plane.

FIG. 1c shows the appearance of the left eye image 10 and right eye image 11. The homologous point 5 in the left eye image 10 is positioned on a reference line 12. The corresponding homologous point 3 in the right eye image 11 is at a different relative position 3 with respect to the reference line 12. The separation 13 of the point 3 from the reference line 12 is called the disparity and in this case is a positive disparity for points which will lie behind the screen plane.

For a generalised point in the scene there is a corresponding point in each image of the stereo pair as shown in FIG. 1a. These points are termed the homologous points. The relative separation of the homologous points between the two images is termed the disparity; points with zero disparity correspond to points at the depth plane of the display. FIG. 1b shows that points with uncrossed disparity appear behind the display and FIG. 1c shows that points with crossed disparity appear in front of the display. The magnitude of the separation of the homologous points, the distance to the observer, and the observer's interocular separation gives the amount of depth perceived on the display.

Stereoscopic type displays are well known in the prior art and refer to displays in which some kind of viewing aid is worn by the user to substantially separate the views sent to the left and right eyes. For example, the viewing aid may be colour filters in which the images are colour coded (e.g. red and green); polarising glasses in which the images are encoded in orthogonal polarisation states; or shutter glasses in which the views are encoded as a temporal sequence of images in synchronisation with the opening of the shutters of the glasses.

Autostereoscopic displays operate without viewing aids worn by the observer. In autostereoscopic displays, each of the views can be seen from a limited region in space as illustrated in FIG. 2.

FIG. 2a shows a display device 16 with an attached parallax optical element 17. The display device produces a right eye image 18 for the right eye channel. The parallax optical element 17 directs light in a direction shown by the arrow 19 to produce a right eye viewing window 20 in the region in front of the display. An observer places their right eye 22 at the position of the window 20. The position of the left eye viewing window 24 is shown for reference. The viewing window 20 may also be referred to as a vertically extended optical pupil.

FIG. 2b shows the left eye optical system. The display device 16 produces a left eye image 26 for the left eye channel. The parallax optical element 17 directs light in a direction shown by the arrow 28 to produce a left eye viewing window 30 in the region in front of the display. An observer places their left eye 32 at the position of the window 30. The position of the right eye viewing window 20 is shown for reference.

The system comprises a display and an optical steering mechanism. The light from the left image 26 is sent to a limited region in front of the display, referred to as the viewing window 30. If an eye 32 is placed at the position of the viewing window 30 then the observer sees the appropriate image 26 across the whole of the display 16. Similarly the optical system sends the light intended for the right image 18 to a separate window 20. If the observer places their right eye 22 in that window then the right eye image will be seen across the whole of the display. Generally, the light from either image may be considered to have been optically steered (i.e. directed) into a respective directional distribution.

FIG. 3 shows in plan view a display device 16,17 in a display plane 34 producing the left eye viewing windows 36,37,38 and right eye viewing windows 39,40,41 in the window plane 42. The separation of the window plane from the display is termed the nominal viewing distance 43. The windows 37,40 in the central position with respect to the display are in the zeroth lobe 44. Windows 36,39 to the right of the zeroth lobe 44 are in the +1 lobe 46, while windows 38,41 to the left of the zeroth lobe are in the −1 lobe 48.

The viewing window plane of the display represents the distance from the display at which the lateral viewing freedom is greatest. For points away from the window plane, there is a diamond shaped autostereoscopic viewing zone, as illustrated in plan view in FIG. 3. As can be seen, the light from each of the points across the display is beamed in a cone of finite width to the viewing windows. The width of the cone may be defined as the angular width.

If an eye is placed in each of a pair viewing zones such as 37,40 then an autostereoscopic image will be seen across the whole area of the display. To a first order, the longitudinal viewing freedom of the display is determined by the length of these viewing zones.

The variation in intensity 50 across the window plane of a display (constituting one tangible form of a directional distribution of the light) is shown with respect to position 51 for idealised windows in FIG. 4. The right eye window position intensity distribution 52 corresponds to the window 41 in FIG. 3, and intensity distribution 53 corresponds to the window 37, intensity distribution 54 corresponds to the window 40 and intensity distribution 55 corresponds to the window 36.

FIG. 5 shows the intensity distribution with position schematically for more realistic windows. The right eye window position intensity distribution 56 corresponds to the window 41 in FIG. 3, and intensity distribution 57 corresponds to the window 37, intensity distribution 58 corresponds to the window 40 and intensity distribution 59 corresponds to the window 36.

The quality of the separation of images and the extent of the lateral and longitudinal viewing freedom of the display is determined by the window quality, as illustrated in FIG. 4. FIG. 4 shows the ideal viewing windows while FIG. 5 is a schematic of the actual viewing windows that may be outputted from the display. Several artefacts can occur due to inadequate window performance. Cross talk occurs when light from the right eye image is seen by the left eye and vice versa. This is a significant 3D image degradation mechanism which can lead to visual strain for the user. Additionally, poor window quality will lead to a reduction in the viewing freedom of the observer. The optical system is designed to optimised the performance of the viewing windows.

The parallax element may be a parallax barrier comprising an array of opaque regions alternating with transmissive regions. Parallax barriers rely on blocking the light from regions of the display and therefore reduce the brightness and device efficiency, generally to approximately 20–40% of the original display brightness. Parallax barriers are not readily removed and replaced due to the requirements of sub-pixel alignment tolerances of the barrier with respect to the pixel structure of the display in order to optimise the viewing freedom of the display. The 2D mode is half resolution.

Another type of parallax optic alternative to a parallax barrier well known in the art for use in stereoscopic displays is a lenticular screen, which is an array of vertically extended cylindrical microlenses.

FIG. 6 shows a typical structure of a prior art display device using a lenticular screen. A backlight 60 produces a light output 62 which is incident on an LCD input polariser 64. The light is transmitted through a TFT LCD substrate 66 and is incident on a repeating array of pixels arranged in columns and rows in an LCD pixel plane 67. The red pixels 68,71,73, green pixels 69,72,75 and blue pixels 70,73 each comprise an individually controllable liquid crystal layer and are separated by regions of an opaque mask called a black mask 76. Each pixel comprises a transmissive region, or pixel aperture 78. Light passing through the pixel is modulated in phase by the liquid crystal material in the LCD pixel plane 74 and in colour by a colour filter positioned on an LCD colour filter substrate 80. The light then passes through an output polariser 82 after which is placed a lenticular screen substrate 94 and a lenticular screen 96 which is formed on the surface of the lenticular screen substrate 92. As for the parallax barrier, the lenticular screen 94 serves to direct light from alternate pixel columns 69,71, 73,75 to the right eye as shown by the ray 88 from the pixel 69 and from the intermediate columns 68,70,72,74 to the left eye as shown by the ray 90 from pixel 68. The observer sees the light from the underlying pixel illuminating the aperture of the individual lenticule, 98 of the lenticular screen 96. The extent of the captured light cone is shown by the captured rays 100.

In the above arrangement the LCD pixel plane acts as a spatial light modulator (SLM). As used in this document, the term spatial light modulator or SLM includes both 'light valve' devices such as liquid crystal displays and emissive devices such as electroluminescent displays and LED displays.

Lenticular displays are described in T. Okoshi "Three Dimensional Imaging Techniques", Academic Press, 1976. One type of lenticular display using a spatial light modulator is described in U.S. Pat. No. 4,959,641. The invention of U.S. Pat. No. 4,959,641 describes non-switching lenticular elements in air.

A lenticular display using cylindrical lenses that are tilted with respect to columns of pixels of a display is described in "Multiview 3D-LCD" published in SPIE Proceedings Vol. 2653, 1996, pages 32 to 39.

The viewing freedom of the flat panel displays described above is limited by the window structure of the display.

A display in which the viewing freedom is enhanced by measuring the position of an observer and moving the parallax element in correspondence is described in EP 0 829 743. Such an observer measurement apparatus and mechanical actuation is expensive and complex.

A display in which the window optical structure is not varied (a fixed parallax optic display for example) and the image data is switched in correspondence to the measured position of the observer such that the observer maintains a substantially orthoscopic image is described for example in EP0721131.

2D–3D Switchable Displays

As described above, the use of parallax optics to generate a spatially multiplexed 3D display limits the resolution of each image to at best half of the full display resolution. In many applications, the display is intended to be used for a fraction of the time in the 3D mode, and is required to have a full resolution artefact free 2D mode.

One type of display in which the effect of the parallax optic is removed is Proc. SPIE vol. 1915 Stereoscopic Displays and Applications IV (1993) pp 177–186, "Developments in Autostereoscopic Technology at Dimension Technologies Inc.", 1993. In this case, a switchable diffuser element is placed in the optical system used to form the light lines. Such a switchable diffuser could be for example of the Polymer Dispersed Liquid Crystal type in which the molecular arrangement switches between a scattering and non-scattering mode on the application of an applied voltage across the material. In the 3D mode, the diffuser is clear and light lines are produced to create the rear parallax barrier effect. In the 2D mode, the diffuser is scattering and the light lines are washed out, creating the effect of a uniform light source. In this way, the output of the display is substantially Lambertian and the windows are washed out. An observer will then see the display as a full resolution 2D display. Such a display suffers from Fresnel diffraction artefacts in the 3D mode, as well as from unwanted residual scatter in the diffuser's clear state which will increase the display crosstalk. Therefore, such a display is likely to exhibit higher levels of visual strain.

In another type of switchable 2D–3D display disclosed in EP-A-0,833,183, a second LCD is placed in front of the display to serve as a parallax optic. In a first mode, the parallax LCD is clear so that no windows are produced and an image is seen in 2D. In a second mode, the device is switched so as to produce slits of a parallax barrier. Output windows are then created and the image appears to be 3D. Such a display has increased cost and complexity due to the use of two LCD elements as well as being of reduced brightness or having increased power consumption. If used in a reflective mode 3D display system, parallax barriers result in very poor brightness due to attenuation of light by the blocking regions of the parallax barrier both on the way in and out of the display.

In another type of switchable 2D–3D display disclosed in EP-A-0,829,744, a parallax barrier comprises a patterned array of half wave retarder elements. The pattern of retarder elements corresponds to the pattern of barrier slits and absorbing regions in a parallax barrier element. In a 3D mode of operation, a polariser is added to the display so as to analyse the slits of the patterned retarder. In this way, an absorbing parallax barrier is produced. In the 2D mode of operation, the polariser is completely removed as there is no involvement of any polarisation characteristics in the 2D mode of operation. Thus the output of the display is full resolution and full brightness. One disadvantage is that such a display uses parallax barrier technology and thus is limited to perhaps 20–30% brightness in the 3D mode of operation. Also, the display will have a viewing freedom and cross talk which is limited by the diffraction from the apertures of the barrier.

It is known to provide electrically switchable birefringent lenses for purposes of switching light directionally. It is known to use such lenses to switch a display between a 2D mode of operation and a 3D mode of operation.

For example, electrically switchable birefringent liquid crystal microlenses are described in European Optical Society Topical Meetings Digest Series: 13, 15–16 May 1997 L. G. Commander et al "Electrode designs for tuneable microlenses" pp 48–58.

In another type of switchable 2D–3D display disclosed in U.S. Pat. No. 6,069,650 and WO-98/21620, switchable microlenses comprising a lenticular screen filled with liquid crystal material are used to change the optical power of a lenticular screen. U.S. Pat. No. 6,069,650 and WO-98/21620 teach the use of an electro-optic material in a lenticular screen whose refractive index is switchable by selective application of an electric potential between a first value whereby the light output directing action of the lenticular means is provided and a second value whereby the light output directing action is removed.

A 3D display comprising a liquid crystal Fresnel lens is described in S. Suyama et al "3D Display System with Dual Frequency Liquid Crystal Varifocal Lens", SID 97 DIGEST pp 273–276.

In another type of switchable 2D–3D display disclosed in WO-03/015,424 a passive birefringent microlens is switched between a 2D and 3D mode by means of controlling the polarisation of light which passes through the lens and reaches an observer. It is also known from this reference to use twist in passive birefringent lenses in order to rotate the input polarisation such that the birefringent microlens geometric axis is parallel to the birefringent material axis at the lens surface. One of the display devices disclosed in WO-03/015,424 is shown in plan view in FIG. 7 and arranged as follows.

A backlight 102 produces illumination 104 of an LCD input polariser 106. The light passes through a thin film transistor (TFT) substrate 108 and is incident on a pixel layer 110 comprising individually controllable phase modulating pixels 112–126. The pixels are arranged in rows and columns and comprise a pixel aperture 128 and may have a separating black mask 130. The light then passes through an LCD counter substrate 132 and a lens carrier substrate 136 upon which is formed a birefringent microlens array 138. The birefringent microlens array 138 comprises an isotropic lens microstructure 140 and an aligned birefringent material with an optical axis direction 142. The output of the birefringent lens then passes through a lens substrate 144 and a polarisation modifying device 146. Each birefringent lens of the lens array is cylindrical; the lens array 138 is a lenticular screen and the geometrical axis of the lenses is out of the page. The pitch of the lenses in this example is arranged to be substantially twice the pitch of the pixels of the display such that a two view autostereoscopic display is produced.

In a first mode of operation, the polarisation modifying device 146 is configured to transmit light with a polarisation state which is parallel to the ordinary axis of the birefringent material of the microlens array. The ordinary refractive index of the material (such as a liquid crystal material) is substantially matched to the index of the isotropic microstructure 140. Thus the lenses have no optical effect and there is substantially no change to the directional distribution of the output of the display. In this mode, an observer will see all the pixels 112–126 of the display with each eye, and a 2D image will be produced.

In a second mode of operation, the polarisation modifying device 146 is configured to transmit light with a polarisation state which is parallel to the extra-ordinary axis of the birefringent microlens array. The extraordinary refractive index of the material (such as a liquid crystal material) is different to the index of the isotropic microstructure 140. Thus the lenses have an optical effect and there is a change to the directional distribution of the output of the display. This directional distribution can be set as well known in the art so as an observer correctly positioned at the front of the display will see a left image in their left eye corresponding to light from left image pixels 112,116,120,124 and in their right eye will see a right image corresponding to right image pixels 114,118,122,126. In this way, a switchable 2D to 3D autostereoscopic display can be produced.

Lens arrays are particularly suitable for autostereoscopic displays because they combine the properties of high optical efficiency, small spot size and ability to be manufactured using well known lithographic processing techniques.

It is also known to provide electrically switchable birefringent lenses for purposes of switching light directionally. It is known to use such lenses to switch a display between a 2D mode of operation and a 3D mode of operation.

In a 3D autostereoscopic display, a lens array (or lenticular screen) may be used to direct the light into a directional distribution consisting of the appropriate viewing windows. This type of lens array may also be used to direct light into other directional distributions. Examples of such directional distributions are disclosed in WO-03/015,424 and include an enhanced brightness distribution in which light is directed into broad horizontal windows in the nominal viewing plane. In the window, the observer will see an increase of brightness proportional to the vertical aperture ratio of the panel. Out of the viewing window, an observer will see the gaps between the pixels, and the display has reduced brightness.

It is the purpose of this invention to provide a switchable directional display in which at least two directional modes of operation are available.

According to the present invention, there is provided a lens array structure comprising a first birefringent lens array and a second birefringent lens array arranged in series, wherein both the first birefringent lens array and the second birefringent lens array are capable of operating to direct incident light of one polarisation into a respective directional distribution and to have substantially no effect on incident light of a polarisation perpendicular to said one polarisation, and the first birefringent lens array and the second birefringent lens array are relatively oriented such that incident light of a first polarisation component is directed into a directional distribution by the first birefringent lens array and not affected by the second birefringent lens array whereas incident light of a second polarisation component polarised in a direction perpendicular to said first polarisation component is not affected by the first birefringent lens array and directed into a predetermined directional distribution by the second birefringent lens array.

Thus, incident light is directed into the directional distribution of either one of the first and second birefringent lens arrays depending on its polarisation. This allows the effect of the lens array structure to be altered by controlling the polarisation of light passing therethrough.

The lens array structure may be incorporated into display apparatus also comprising a spatial light modulator and a switchable polarisation control device arranged to control the polarisation of light passing through the display to output from the display device light of a polarisation component selectively corresponding to either said first polarisation component or said second polarisation component. The display device is operable in two modes in which the output light is directed into different directional distributions, depending on whether the light output from the display device is of a polarisation component corresponding to the first or second polarisation component incident on the lens array structure. Switching between the two modes occurs by switching of the polarisation control device.

The directional distribution into which the first and second birefringent lens arrays direct light may be any two of the following:
  autostereoscopic landscape distribution;
  autostereoscopic portrait distribution;
  two view autostereoscopic distribution;
  multi-view autostereoscopic distribution;
  tilted lens autostereoscopic distribution;
  enhanced brightness distribution; or
  multi-viewer distribution.

The lens arrays may both be passive. In this case, the lens array structure has two possible modes of operation corresponding to the effect on the first and second polarisation components.

Alternatively, one or both of the lens arrays may be an active lens array switchable between a first mode in which it directs incident light of one polarisation into a respective directional distribution and has substantially no effect on incident light of a polarisation perpendicular to said one polarisation and a second mode in which it has substantially no optical effect. By use of the active lens array in the first mode, the lens array structure has two modes of operation in both of which a different directional distribution is achieved depending on the polarisation control as described above. By use of the active lens array in its second mode, the lens array structure has a third mode of operation in which the lens array structure has no optical effect at all. Such an active lens array may be incorporated in a display apparatus as described above but additionally with a control circuit arranged to control switching of the at least one active lens array. Thus the display apparatus has a "non-directional mode" in which there is substantially no modification of the input illumination of the lens array.

Such devices can be used for:
  an autostereoscopic display means which can conveniently provide a moving full colour 3D stereoscopic image which may be viewed by the unaided eye in a first mode of operation and a full resolution 2D image in a second mode of operation;
  a switchable high brightness transflective and reflective display system which in a first mode may exhibit substantially non-directional brightness performance and in a second mode may exhibit substantially directional brightness performance; or
  a multi-viewer display means which can conveniently provide one 2D image (which may be moving full colour) to one observer and at least a second different 2D image to at least a second observer in one mode of operation and a single full resolution 2D image seen by all observers in a second mode of operation.

In another form according to the present invention there is provided, a directional display apparatus comprising:
  a first birefringent lens array;
  a second birefringent lens array;
  a spatial light modulator which may have a polarised output;
  at least one refractive surface phase step switching means arranged to control the phase step at first or second lens surfaces arranged so that at least two directional modes may be generated by the display apparatus.

Desirably, the lens arrays are cylindrical.

Desirably, each lens array comprises an isotropic material and a birefringent material.

One possibility is for the refractive index of the isotropic materials to be substantially the same and substantially equal to one of the refractive indices of the birefringent material.

Another possibility is for the refractive index of one of the isotropic materials to be substantially the same as the ordinary refractive index of the birefringent material, and the refractive index of the other of the isotropic materials to be substantially the same as the extraordinary refractive index of the birefringent material.

The switching means may include a switchable polarisation rotator, which may be positioned between a spatial light modulator output polariser and the lens array.

One or both lenses may be active in which case the switching means may include a switchable electric field across a lens, comprising an active lens;

The switching means may be a combination of a switchable polarisation rotator and a switchable electric field across the lens.

Embodiments of the present invention will now be described, by way of example only, with reference to the accompanying drawings, in which.

Figure 21:
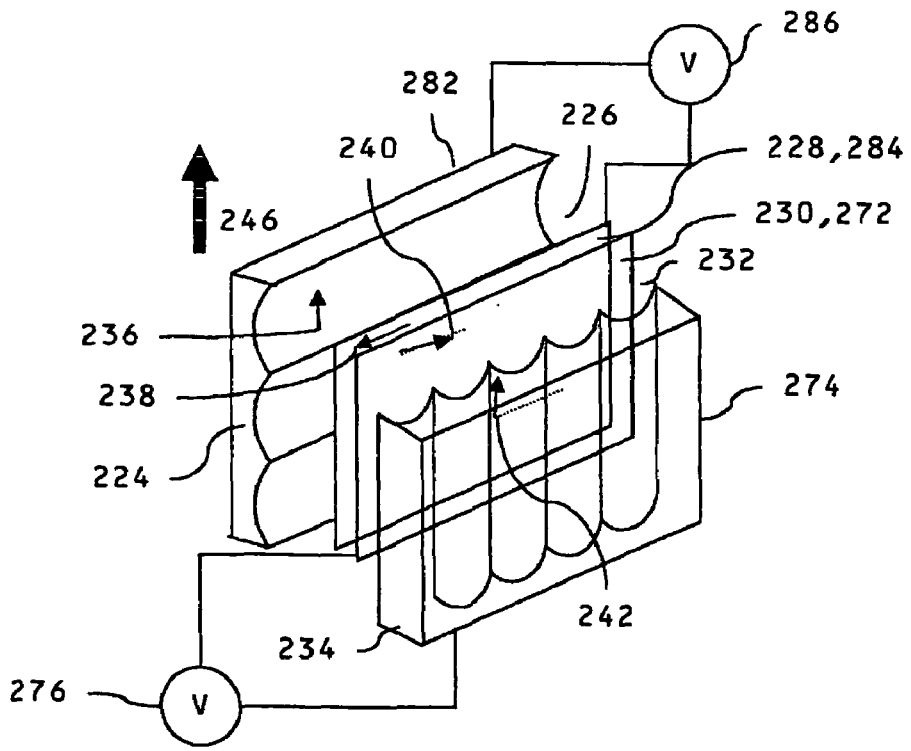
Figure 22:
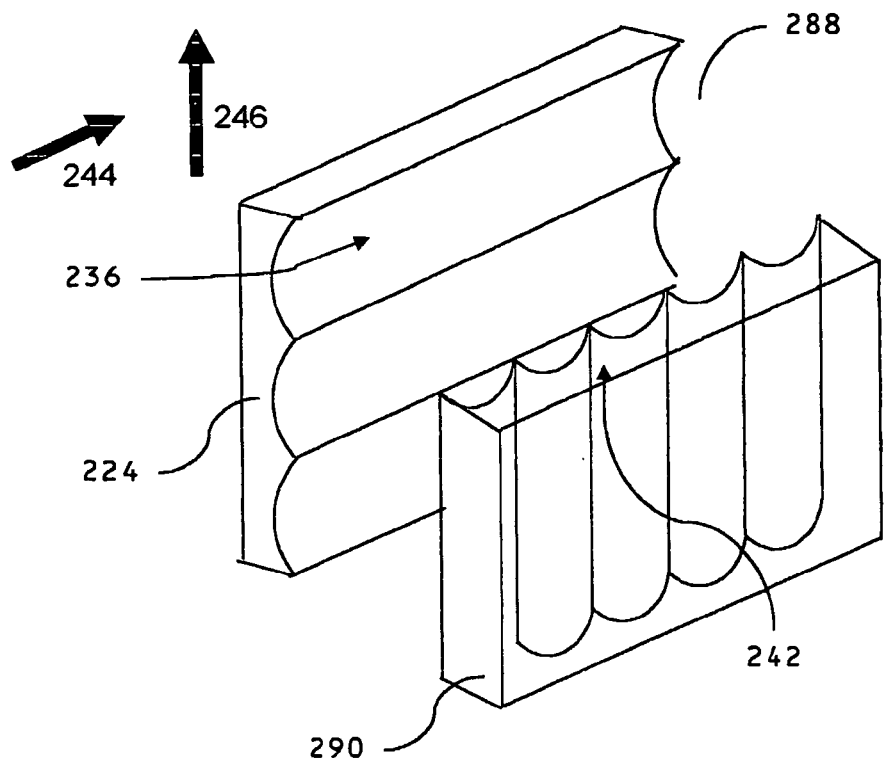
Figure 23:
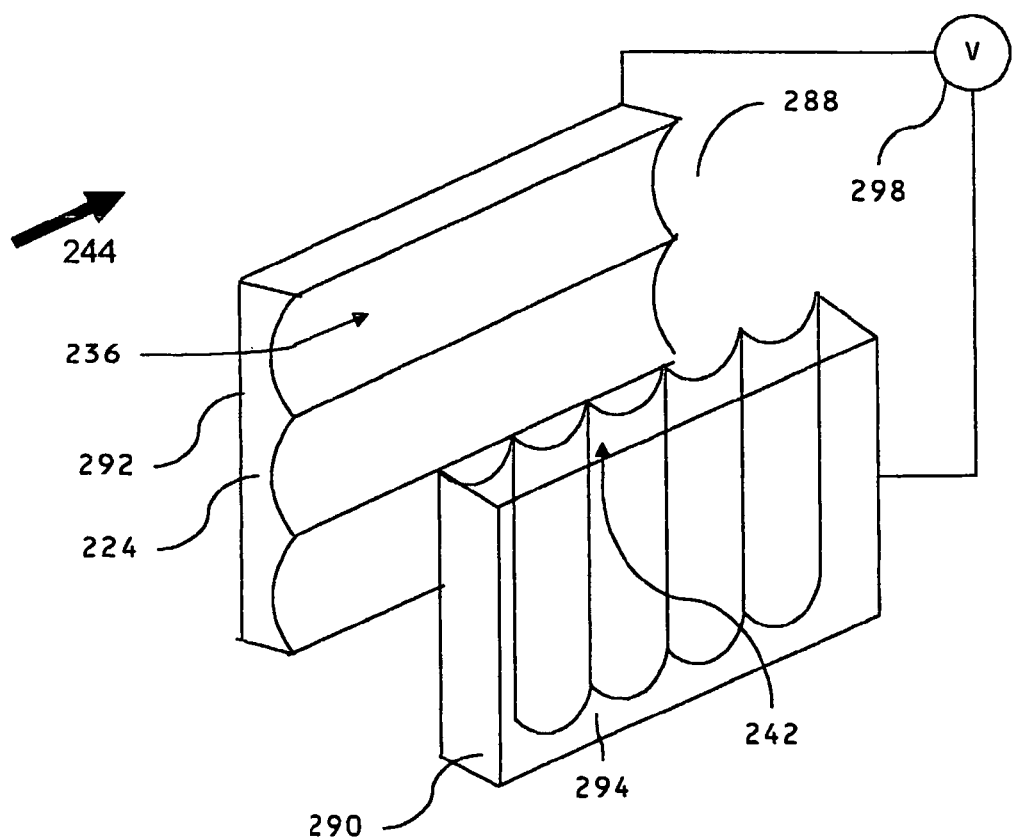

FIG. 21 shows an embodiment of the invention in which a a non directional mode and two different directional modes are produced using a pair of active lenses; and FIG. 22 shows an embodiment of the invention in which two directional modes are achieved by controlling the incident polarisation state; and FIG. 23 shows an embodiment of the invention in which two directional modes are achieved by controlling the electric field across the cell.

Some of the various embodiments employ common elements which, for brevity, will be given common reference numerals and a description thereof will not be repeated. Furthermore the description of the elements of each embodiment applies equally to the identical elements of the other embodiments and the elements having corresponding effects, mutatis mutandis. Also, the figures illustrating the embodiments which are displays show only a portion of display, for clarity. In fact, the construction is repeated over the entire area of the display.

In this specification, the direction of the optical axis of the birefringent material (the director direction, or the extraordinary axis direction) will be referred to as the birefringent optical axis. This should not be confused with the optical axis of the lenses which is defined in the usual way by geometric optics.

A cylindrical lens describes a lens in which an edge (which has a radius of curvature and may have other aspheric components) is swept in a first linear direction. The geometric microlens axis is defined as the line along the centre of the lens in the first linear direction, i.e. parallel to the direction of sweep of the edge. The term "cylindrical" as used herein has its normal meaning in the art and includes not only strictly spherical lens shapes but also aspherical lens shapes.

In a 2D–3D type display, the geometric microlens axis is vertical, so that it is parallel or at a slight angle to the columns of pixels of the display. In a brightness enhanced display as described herein, the geometric microlens axis is horizontal so that it is parallel to the rows of the pixels of the display.

The pitch of the lenses of the lens array of a two view autostereoscopic 3D display is substantially equal to twice the pitch of the pixels of a spatial light modulator with which the lens array is to be used. In fact the pitch of the lenses in a lens array is slightly less than twice the pitch of the pixels of the spatial light modulator to steer the light to the viewing window in way commonly known as "viewpoint correction". The curvature of the lenses is set substantially so as to produce an image of the LCD pixels at the window plane. As the lenses collect the light in a cone from the pixel and distribute it to the windows, lens arrays provide the full brightness of the incident light.

Prior art directional displays such as those incorporating cylindrical lenses, arrays of elongate slits or rows of holograms produce parallax in a single direction only. This conveniently serves to reduce the loss of resolution imposed by the optical element in the directional mode. However, the display orientation of the directional mode is fixed by the geometry of the optical element axis configuration, so the display can only be used in one of landscape or portrait mode.

In devices such as mobile phones and cameras, it is often desirable to rotate the display to best fit the application, for example between a menu interface and a game application. Such functions cannot be enabled in a standard directional display.

It is generally desirable in addition to switch the directional functionality between a first non-directional mode in which the behaviour of the panel is substantially the same as the base panel, and a second directional mode in which the behaviour of the panel is a directional display, for example an autostereoscopic display.

The embodiments can achieve the following advantages, singly or in any combination:

multiple modes of operation of the directional display device can be arranged with independent performance;

a non-directional mode can be configured;

display has substantially the full brightness of the base display;

can use standard materials and processing techniques;

low cost;

compatible with off-the shelf flat panel displays; and/or high performance of display in directional modes.

FIGS. 8 to 11 show display apparatuses to which a lens array structure in accordance with the present invention may be applied. These display apparatuses are similar to that illustrated in FIG. 7 and described above with changes as follows. The backlight and input polarisers are not shown.

Figure 1A:
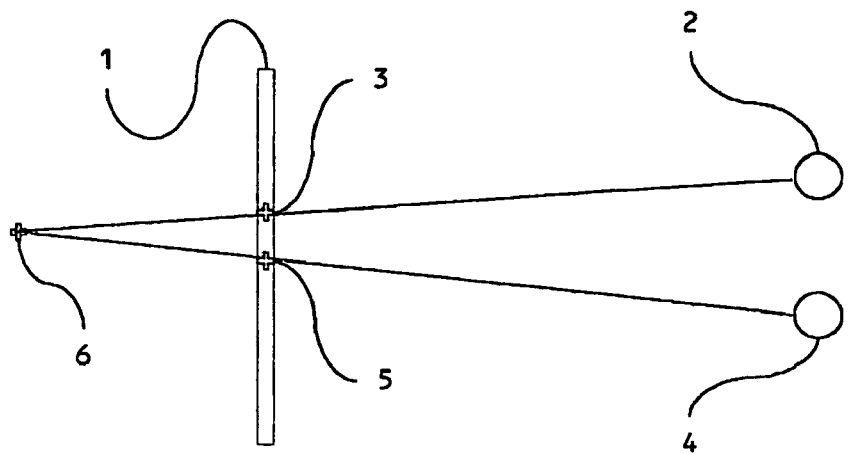
FIG. 1a shows the generation of apparent depth in a 3D display for an object behind the screen plane.
Figure 1B:
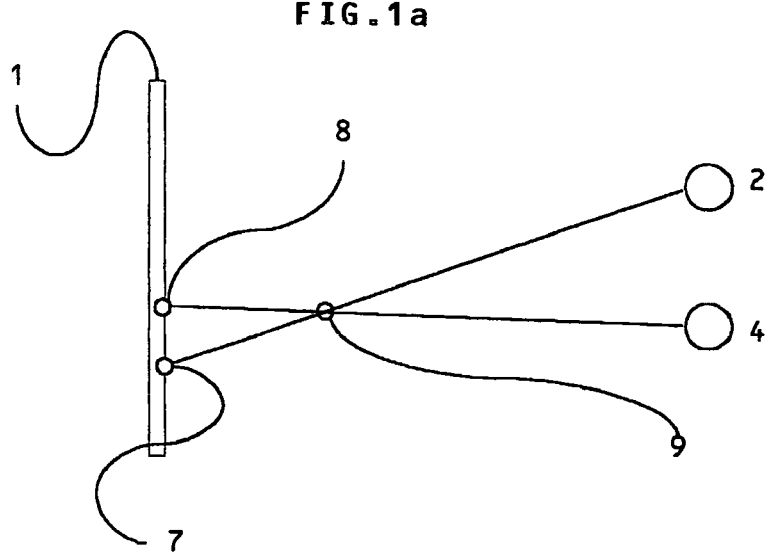
FIG. 1b shows the generation of apparent depth in a 3D display for an object in front of the screen plane.
Figure 1C:
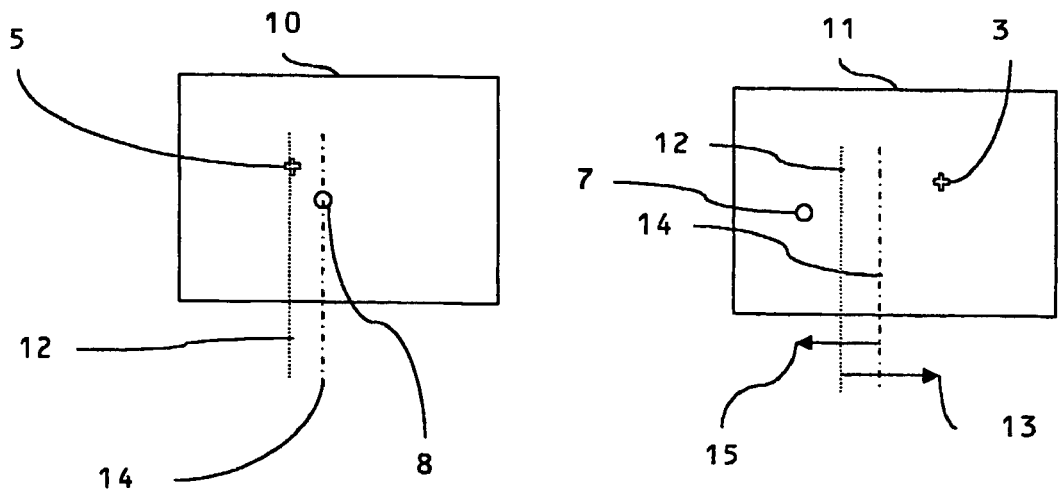
FIG. 1c shows the position of the corresponding homologous points on each image of a stereo pair of images.
Figure 2A:
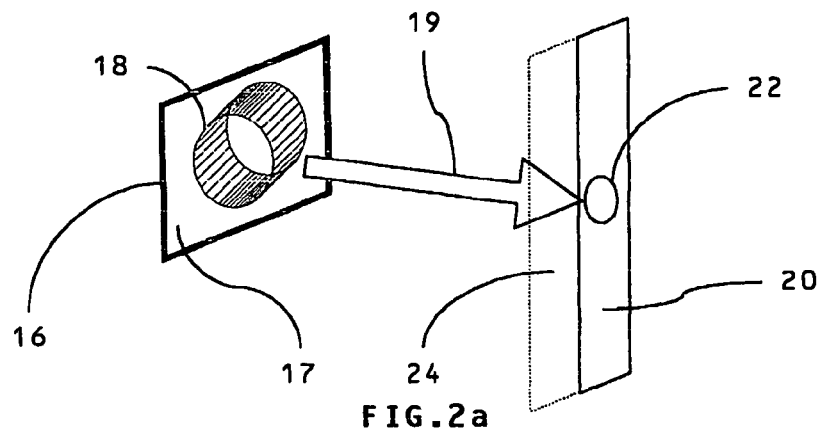
FIG. 2a shows schematically the formation of the right eye viewing window in front of an autostereoscopic 3D display.
Figure 2B:
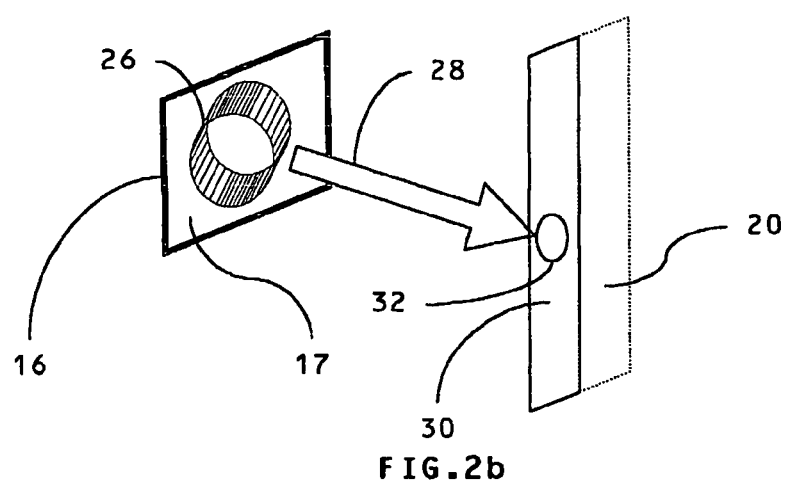
FIG. 2b shows schematically the formation of the left eye viewing window in front of an autostereoscopic 3D display.
Figure 3:
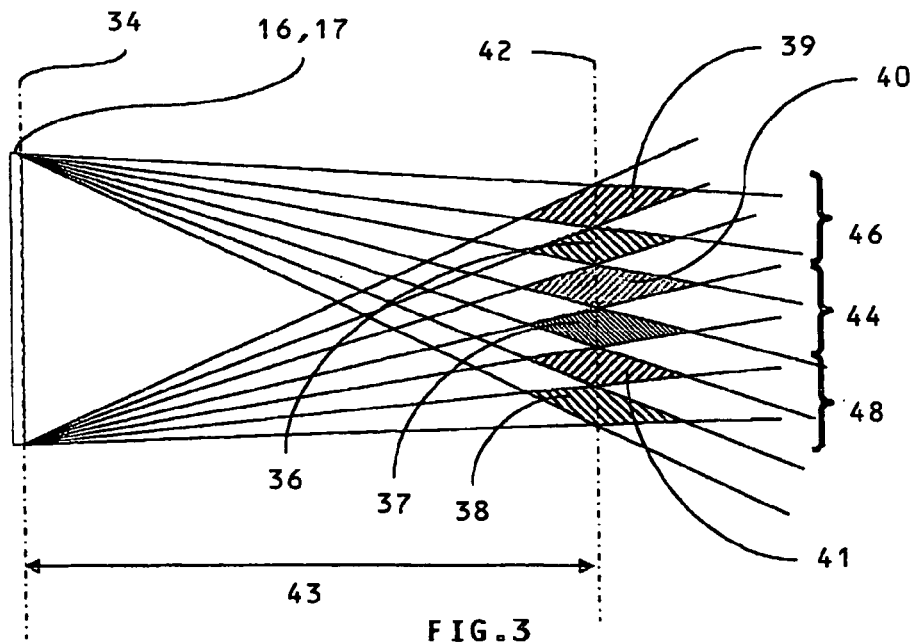
FIG. 3 shows in plan view the generation of viewing zones from the output cones of a 3D display.
Figure 4:
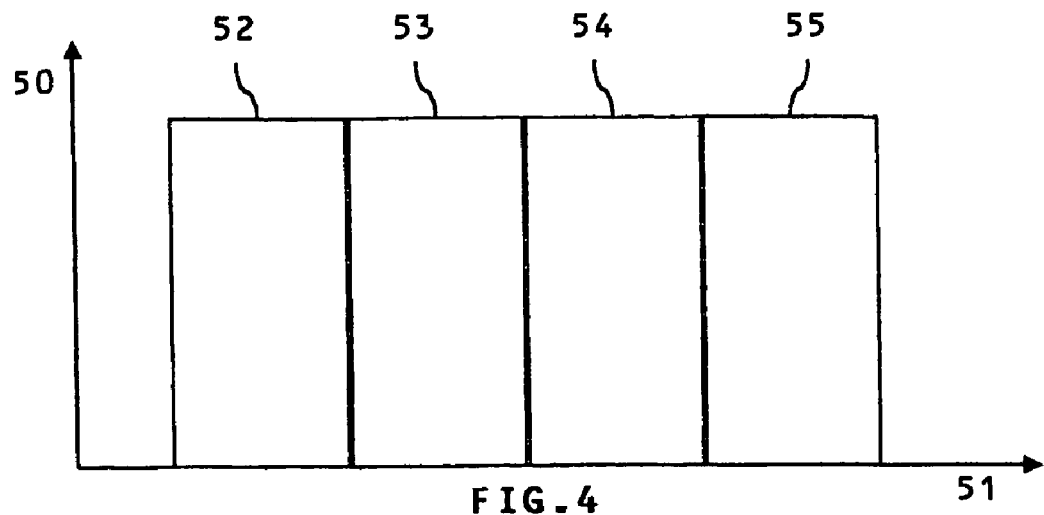
FIG. 4 shows the ideal window profile for an autostereoscopic display.
Figure 5:
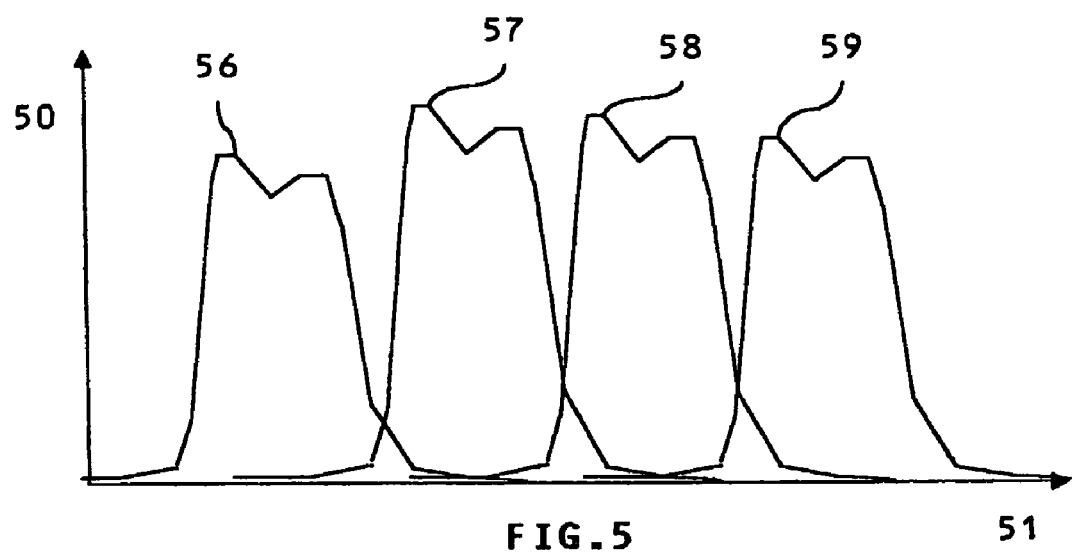
FIG. 5 shows a schematic of the output profile of viewing windows from an autostereoscopic 3D display.
Figure 6:
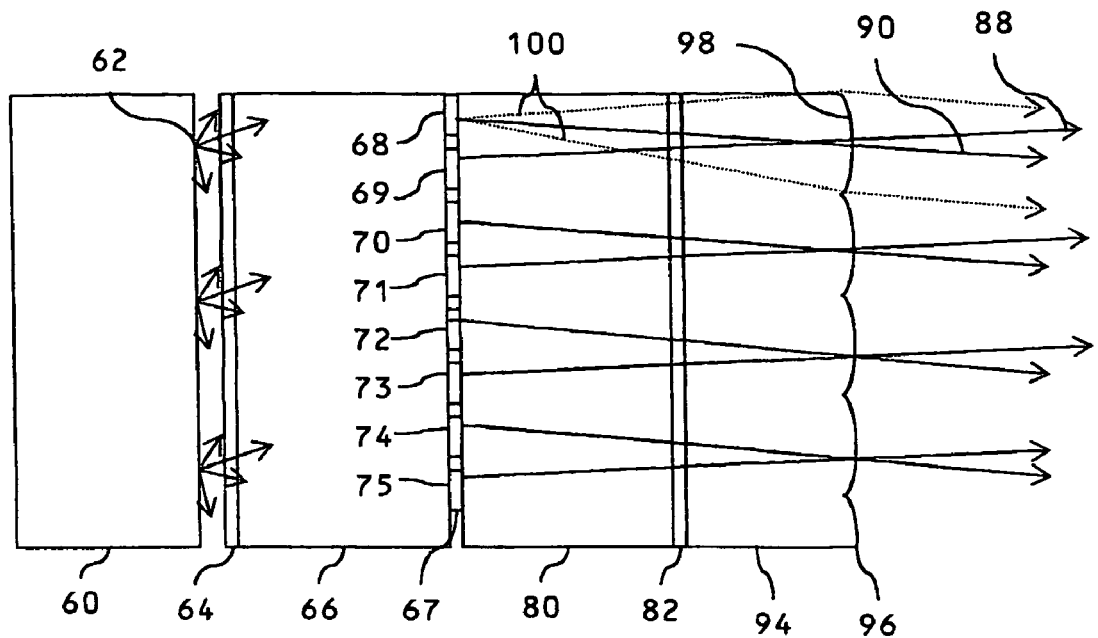
FIG. 6 shows the structure of a lenticular screen display.
Figure 7:
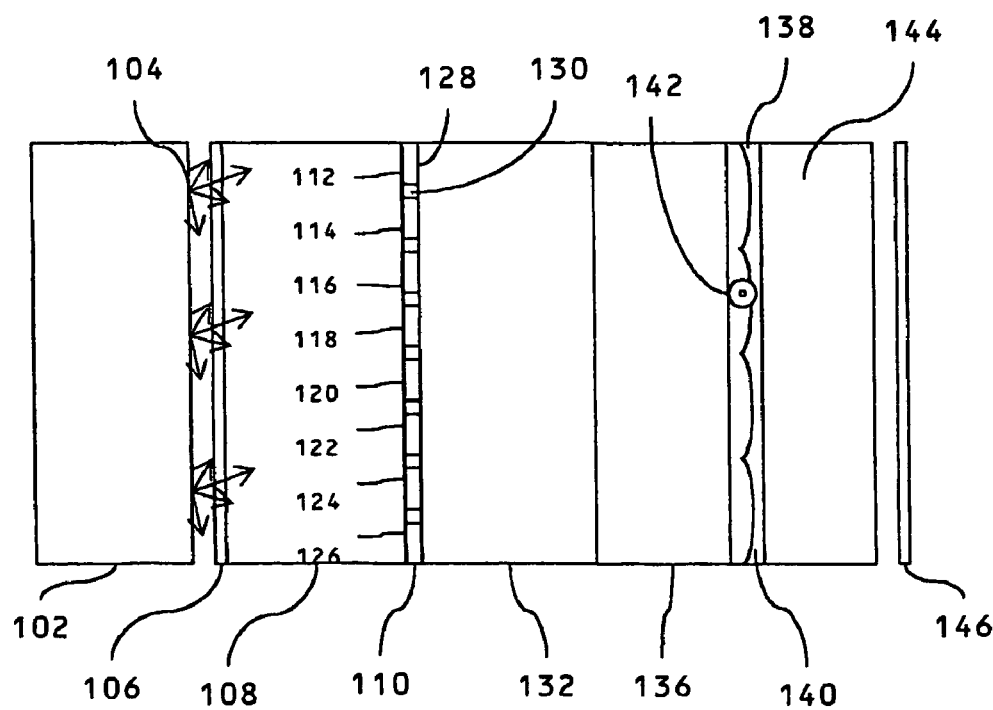
FIG. 7 shows a prior art polarisation activated microlens display.
Figure 8:
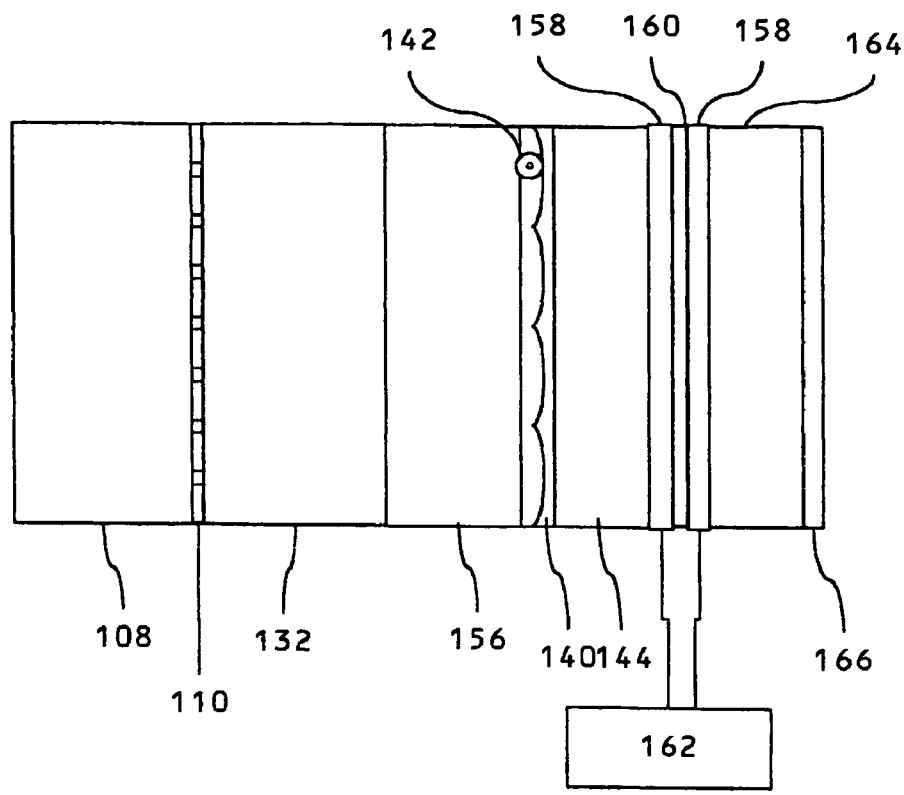
FIG. 8 shows a prior art polarisation activated microlens display.

In the display apparatus of FIG. 8, the polariser 146 of FIG. 7 is replaced by an electrically controlled polarisation switch comprising additional ITO layers 158 and 158 sandwiching a liquid crystal layer 160, an output substrate 164 and an output polariser 166. An electrical signal controller 162 allows switching of the electric field between the ITO electrodes to allow the liquid crystal material 160 to switch. This allows control of the polarisation state transmitted through the output polariser 166, and thus the function of the lens, as described previously.

Figure 9:
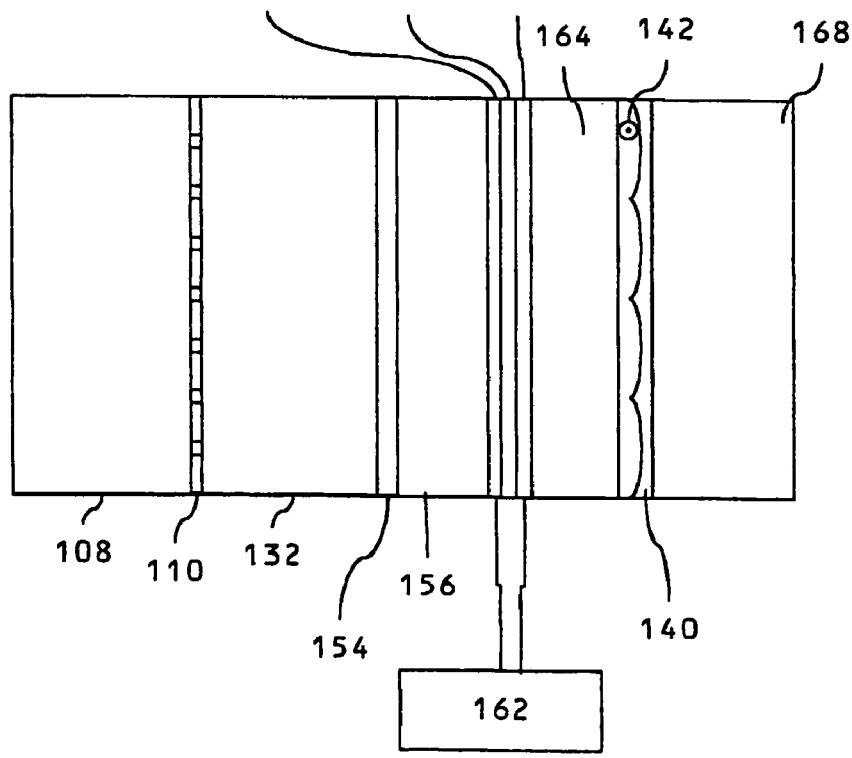
FIG. 9 shows a prior art polarisation activated microlens display.

FIG. 9 shows a similar notional device to that in FIG. 8, but an output polariser 154 is placed on the counter substrate 132, and the ITO electrodes alignment layer 158 and LC layer 160 are placed between the lens 142 and the polariser 154. Such a configuration allows switching of the lens with full image contrast and brightness.

Figure 10:
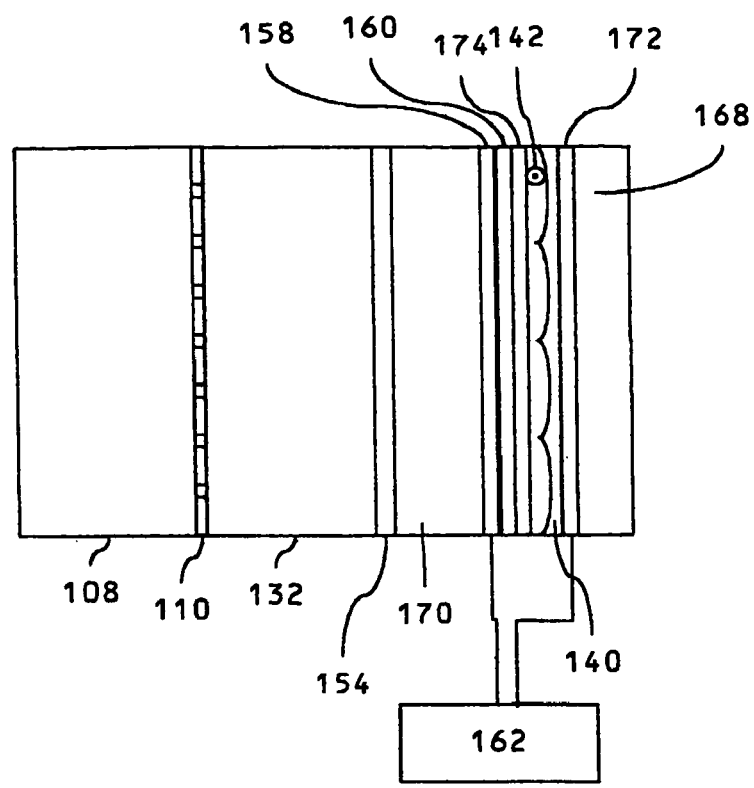
FIG. 10 shows a prior art polarisation activated microlens display.

FIG. 10 shows an alternative configuration in which the electrodes and liquid crystal switch 174 and liquid crystal switch 160 are placed in contact with the liquid crystal lens, which may be a solid liquid crystal lens. An ITO electrode 172 is incorporated on one side of the lens.

Figure 11:
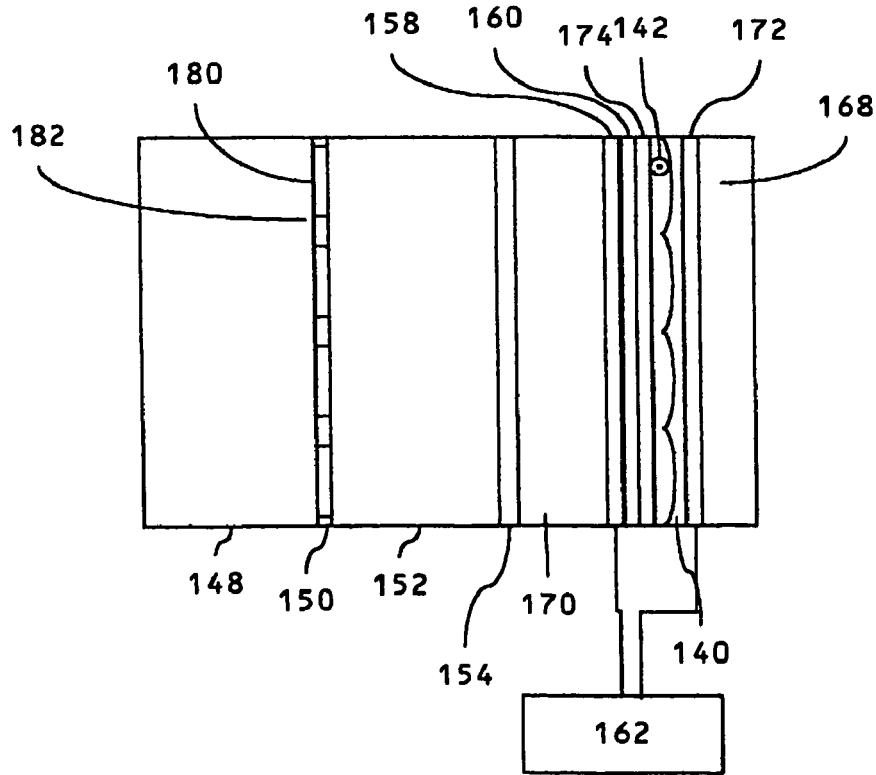
FIG. 11 shows a prior art polarisation activated microlens display.

FIG. 11 shows an alternative configuration of the display of FIG. 10, in which the two view pixel columns of an autostereoscopic display are replaced by the apertures of an enhanced brightness display.

Figure 12:
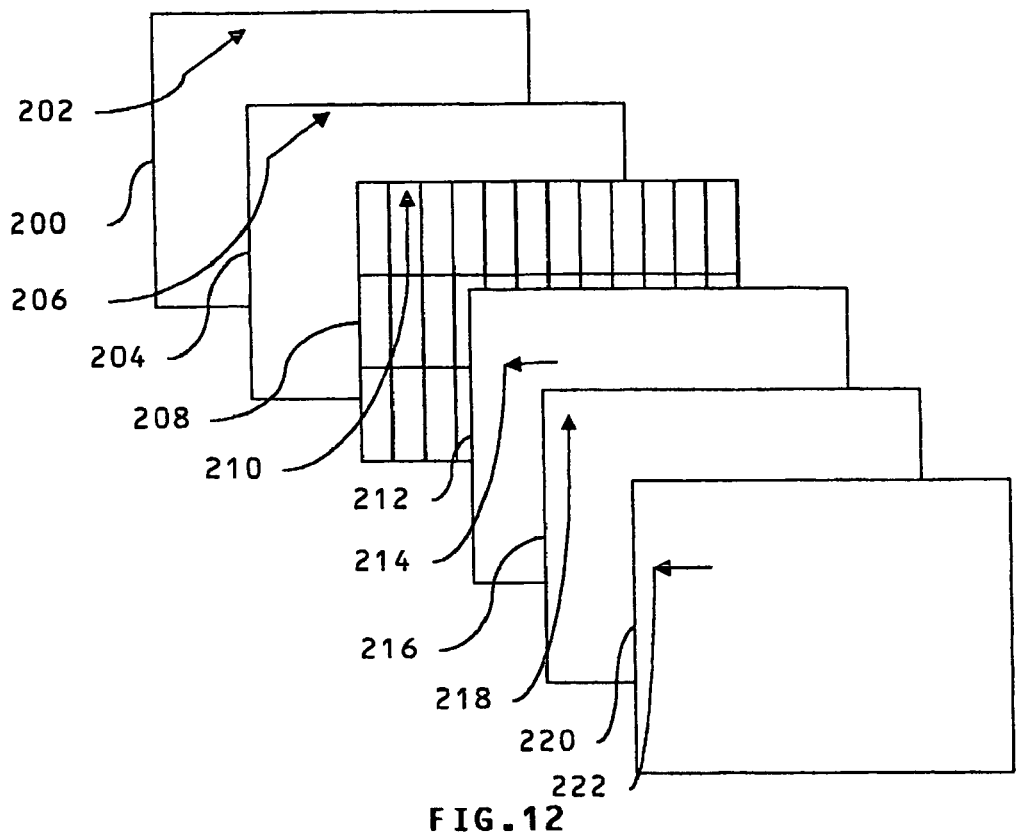
FIG. 12 shows an example of a switchable display with a single directional ode with vertical and horizontal directionality.

A notional apparatus which is not in accordance with the present invention but which can be switched between a non-directional and directional mode and can allow directional operation in both portrait and landscape orientations is illustrated in FIG. 12 for the case of a Polarisation Activated Microlens display, similar to structure and operation as that shown in FIG. 8. An LCD panel output substrate 200 has a linear output polarisation 202. The output polarisation state is incident on a lens array comprising a birefringent material (not shown) sandwiched between a counter substrate 204 with an alignment direction 206 and a surface relief lens 208 with an alignment direction 210. The output light passes through a liquid crystal shutter comprising ITO electrodes 212,214 with respective alignment directions 216,218 sandwiching a liquid crystal layer (not shown). The light then passes through a final output polariser 220 with polarisation transmission direction 222.

The lens array 208 of such a display is non-cylindrical. The lens may be arranged to have the pitch of for example substantially two columns of pixels in a first direction, and two rows of pixels in a second direction. Thus the display can in principle show an autostereoscopic display in both landscape and portrait modes of operation. The panel can be oriented in this example as a landscape panel with vertical columns of red, green, and blue pixels for example. To switch between the two modes, the left and right eye data on the panel can be in adjacent columns for landscape operation and adjacent rows for portrait operation.

Disadvantageously, a surface relief lens will have a single maximum depth which is the same for both horizontal and vertical lens axes. However, as the lens will generally be of non-square shape then the radius of curvature can be significantly different for horizontal and vertical directions. Thus, the focal length of the lens will be different in the two orientations. However, the pixel plane is a single fixed distance from the lens surface and so the device can only be focussed for optimum operation in one orientation, or set at a compromise focus for both. This means that in at least one mode, the windows produced may be undesirable quality. Additionally, in the directional mode of operation, the display will provide imaging of the gaps between pixels in both vertical and horizontal axes, so that as the display is tilted about an axis, the image will appear to flicker. Additionally, the display will show limited resolution in both horizontal and vertical directions.

Further disadvantageously, it can be difficult to maintain high performance alignment of the birefringent material at the surface of the lens array.

Thus, a non-cylindrical lens can be used to switch between a directional and non-directional display which can be used in both portrait and landscape orientations. However, such a display presents a number of disadvantages including those stated above.

In the following diagrams, where a symbol is used to illustrate the orientation of the birefringent material at a surface, or in or out of the plane of the page, it is to be understood that the orientation may deviate a small amount from that shown because of pre-tilt of the birefringent material at the surface, as is well known in the art.

The spatial light modulator of the invention may be a transmissive display, a reflective display, a transflective display or an emissive display (such as an organic electroluminescent display) or a combination. In the case of non-polarised displays, a additional polariser and waveplate layers may be used.

FIG. 13 clarifies the description of landscape and portrait panels. In FIG. 13a, a landscape panel 300 has columns of red 302, green 304 and blue 306 pixels. When rotated to portrait mode as shown in FIG. 13b, the pixel columns also rotate. FIG. 13c shows a portrait panel 308 with columns of red 310, green 312 and blue 314 pixels. FIG. 13d shows the portrait panel rotated for landscape use.

Embodiments of the present invention may be formed based on any of the display apparatuses shown in FIGS. 7 to 11 or disclosed in WO-03/015,424 and replacing the lens array with a lens array structure having any one of the following arrangements. Thus the various features of the display apparatuses disclosed in WO-03/015,424, which is incorporated herein by reference, may equally be applied to the present case.

Figure 14:
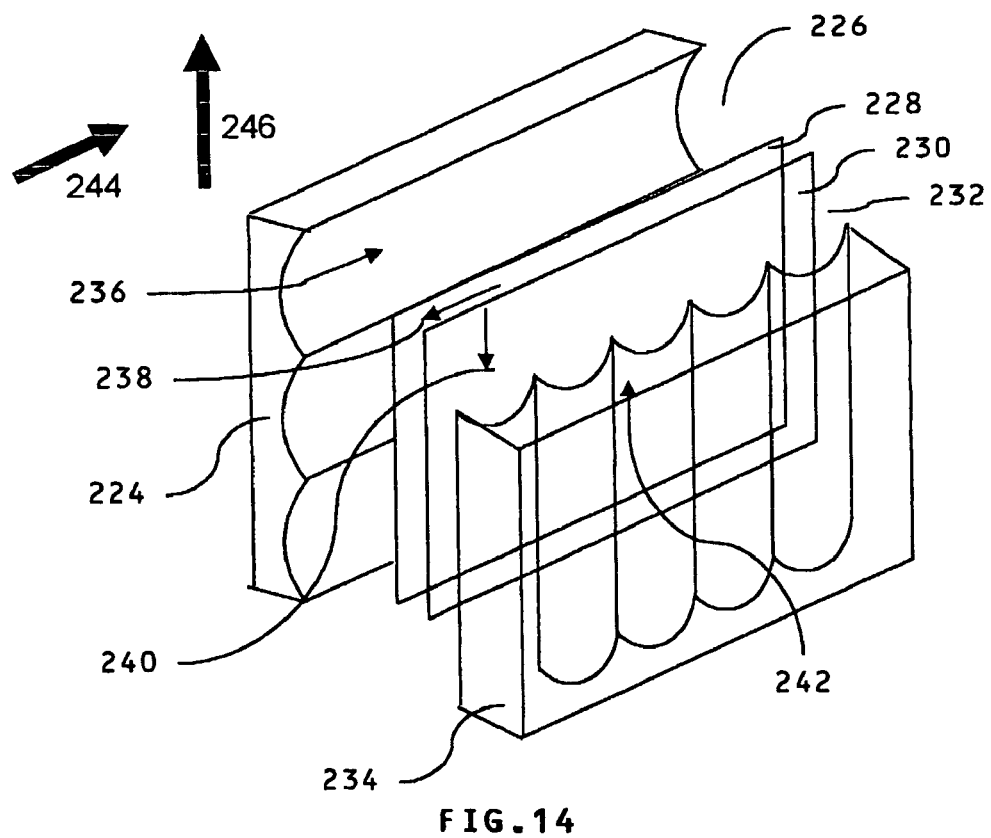
FIG. 14 shows an embodiment of the invention comprising a switchable directional display with orthogonal lenses.
Figure 13A:
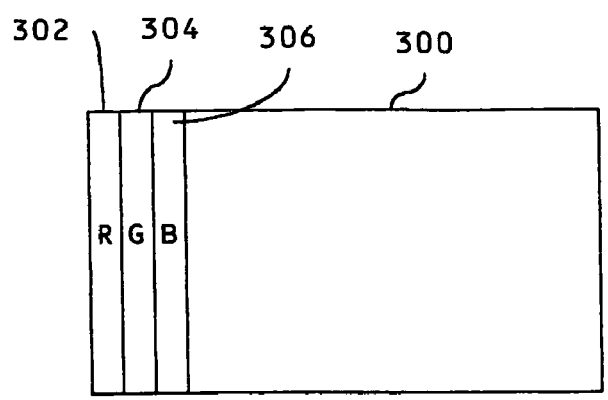
FIG. 13 illustrates Portrait and landscape panels in portrait and landscape use.
Figure 13B:
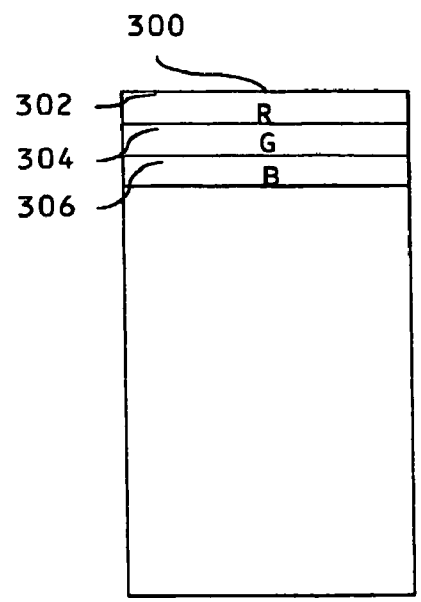
Figure 13C:
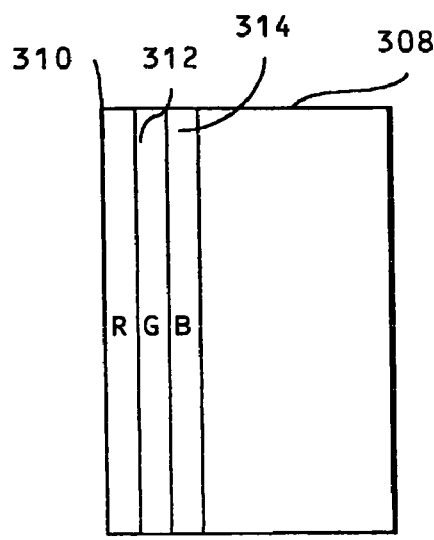
Figure 13D:
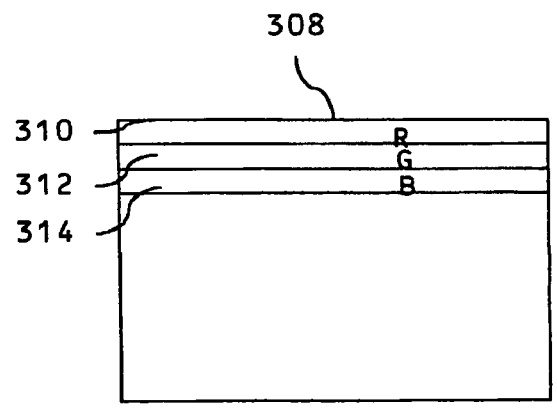

A switchable lens array structure which is not switchable to a non-directional mode, but has two directional modes is shown in FIG. 14. In the example shown, the lens comprises an isotropic surface relief layer 224, a birefringent material 226, layer 228 with an aligning function for the birefringent material, a second layer 230 with an aligning function for the birefringent material, a second birefringent material 232 and a second isotropic surface relief layer 234. The alignment directions 236–242 at each surface are marked. The alignment directions 238,240 may be orthogonal to the respective alignment directions 236, 242, or may be parallel.

The ordinary refractive index of the birefringent material is set to be substantially the same as the isotropic material index. The lens of the cylindrical lens array 224 is set horizontal, with a pitch substantially twice the pitch of the rows of the pixels of the display (not shown). The lens of the cylindrical lens array 234 is set vertical with a pitch substantially twice the pitch of the columns of the display. The alignment direction 230 of the birefringent material optical axis at the lens 224 is set parallel to the lens geometric axis, and an anti-parallel alignment direction 238 is set on the lens counter substrate 228. The alignment layers 228 and 230 may be positioned on either side of a thin substrate such as a glass Microsheet (not shown) for example. The alignment direction 240 of the birefringent material at the surface 230 is orthogonal to the alignment direction 238 and anti-parallel to the alignment direction 242.

In operation, a first linear polarisation state 244 is incident on the lens. The polarisation state is parallel to the extraordinary axis of the birefringent material 226, so that an index step occurs at this surface and the lens function is produced. The light passes through to the alignment layer 228 and is incident on the material in the second lens 232. In this case, the polarisation state sees the ordinary index of the second birefringent material which is matched to the refractive index of the isotropic material, and so a the second lens 234 surface, no function is produced. For the orthogonal polarisation state 246, the light is index matched at the first lens and a lens function is produced at the second lens.

Thus, by changing the polarisation state that passes through the lens and to the observer, two different lens functions can be analysed. Such a lens can be used to construct a display which can be switched between portrait and landscape modes of autostereoscopic 3D operation.

The operation of the display is similar to that described previously.

Alternatively one of the lenses can be a landscape autostereoscopic 3D display lens, while the other is a brightness enhancement display lens.

Alternatively, one of the lenses can be a two-view autostereoscopic display while the other is a multi-view autostereoscopic display using tilted lenses. In this case, both panel orientations may be landscape for example.

Thus any two combinations of directional display modes may be produced.

The orientation of the isotropic and birefringent element of each of the lens arrays may be arranged with curvatures and refractive indeces set so that a focus is produced at the pixel plane. The curvatures of each surface may be positive or negative with respect to the direction of propagation of the light in the system, depending on the material indeces on either side of the interface. It should be noted that the focal length of one lens needs to be different from the other by an amount substantially equal to the substrate thickness. Advantageously, the lens further from the pixel plane may be chosen to be that required to image the largest lateral lens pitch for the mode of operation so that the lens sag is minimised. Alternatively, the lens further from the pixel plane may be chosen to be that required to image the largest lateral pixel pitch for the mode of operation so that the viewing distance is nominally the same for the two lenses.

Figure 15:
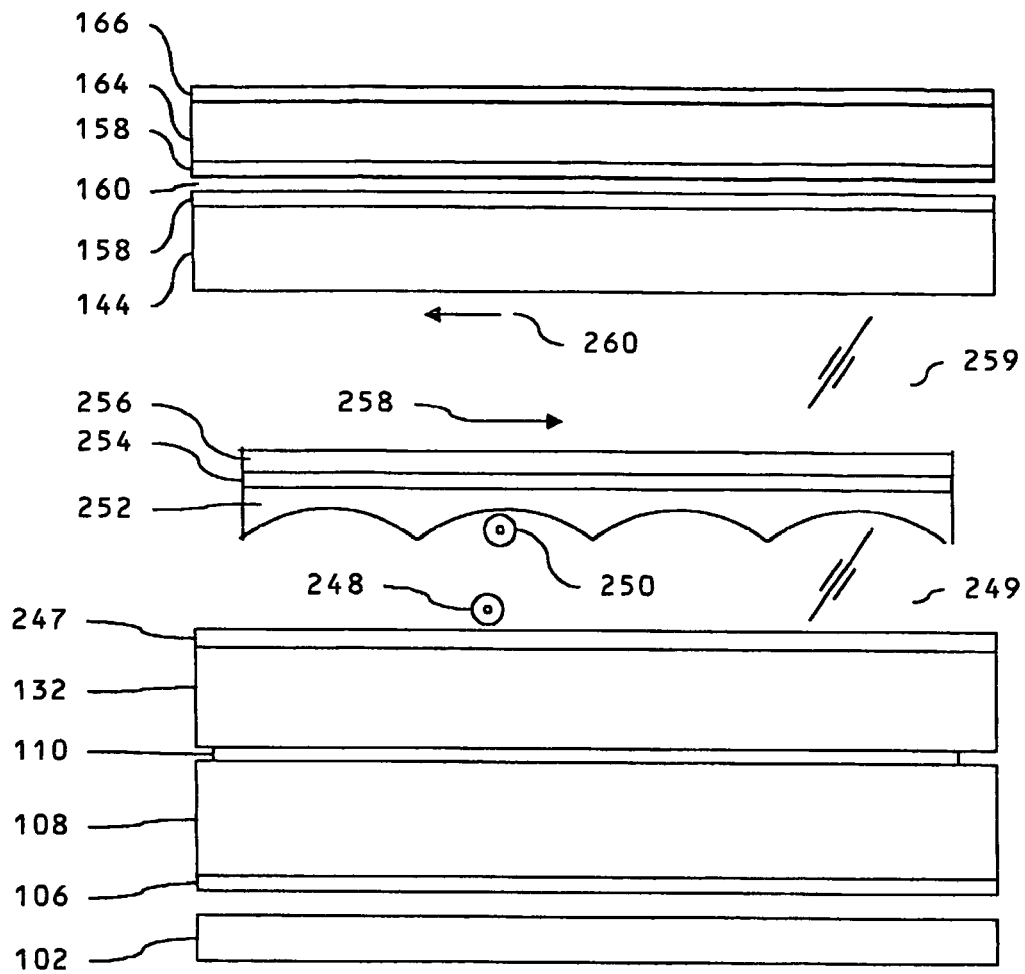
FIG. 15 shows the structure of the display using the configuration of FIG. 14.

A lens array structure similar in function to the lens described in FIG. 14 can also be configured as shown in cross section in FIG. 15 for example. Light from the backlight of a TFT-LCD 102,106,108,110,132 for example passes through a lens counter substrate 247 with alignment layer direction 248 to a birefringent material 249 and to an isotropic lens 252 with surface alignment direction 250. The lens 252 serves to image the pixels from the pixel plane 110 to the output windows. The isotropic material is attached to an optional thin substrate 254 such as a Microsheet for example. The thickness of the layer 254 can be adjusted to optimise the separation of the respective lenses from the pixel plane. For example, a landscape mode 3D lens may require a short separation, whereas a portrait mode 3D lens may require a long separation.

The second lens 256 has an axis that may be rotated compared to the axis of the first lens 252 for example, and may have a different radius of curvature. As the lens is rotated, it does not appear to have in curvature in this cross section. The light passes through a second birefringent material 259 with alignment directions 258 and 260 at opposing surfaces. Again, the alignment directions 258 and 260 are orthogonal. The operation of the display in switching between the two directional modes is as described previously.

Figure 16:
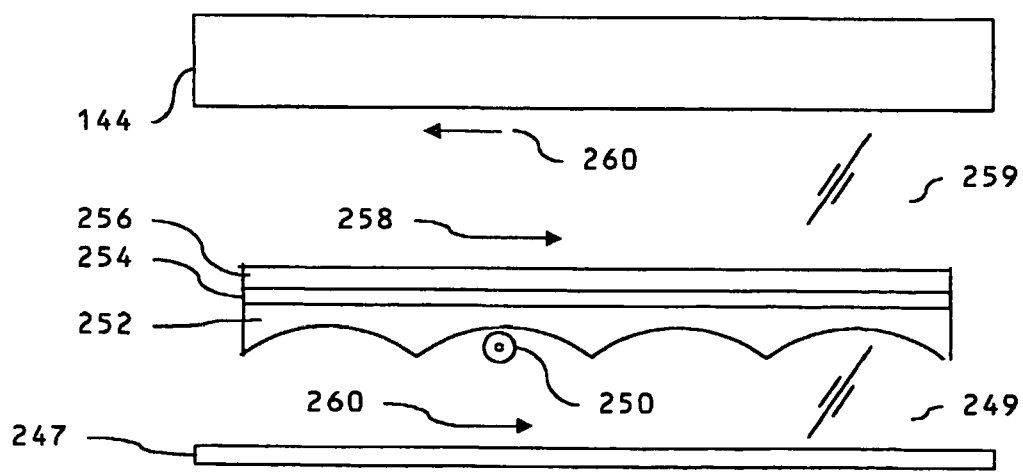
FIG. 16 shows alternative alignment directions for part of FIG. 15.

FIG. 16 shows a part of the structure of FIG. 15, but the alignment direction 260 has been adjusted to match the output polarisation of the LCD. A rotation of the linear polarisation direction will take place in the birefringent material 249 due to the birefringence and guiding of the birefringent material. For example, the output polarisation direction of the LCD may be at 45 degrees compared to the vertical in plan view of the panel. The alignment direction 260 would then be at 45 degrees to the axis of the lens 252. The remainder of the alignment directions may be the same as described previously.

In each case, the direction of alignment between the two parts of the lens are orthogonal, so that the lenses can exhibit independent behaviour.

Figure 17A:
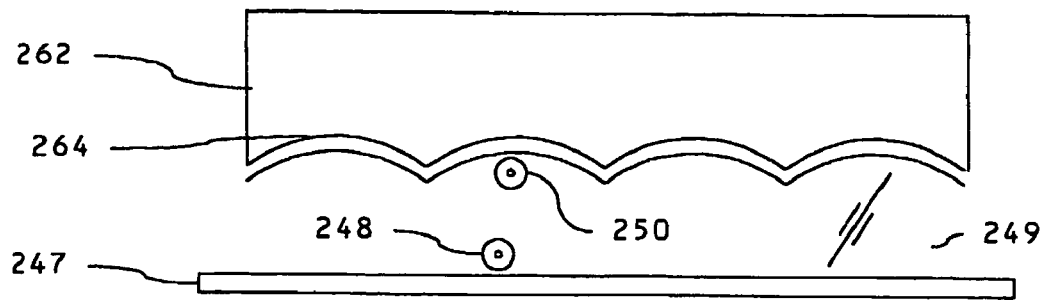
FIG. 17 shows one method to fabricate the lens structure of FIG. 15.
Figure 17B:
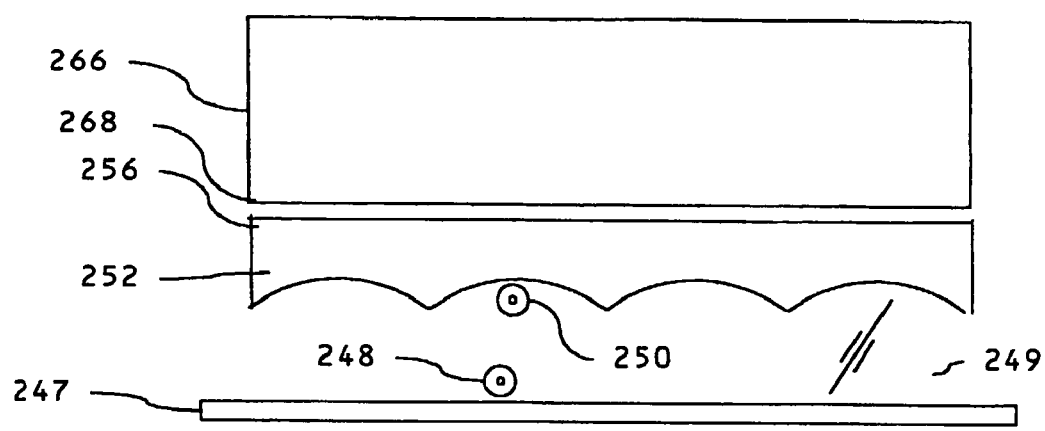
Figure 17C:
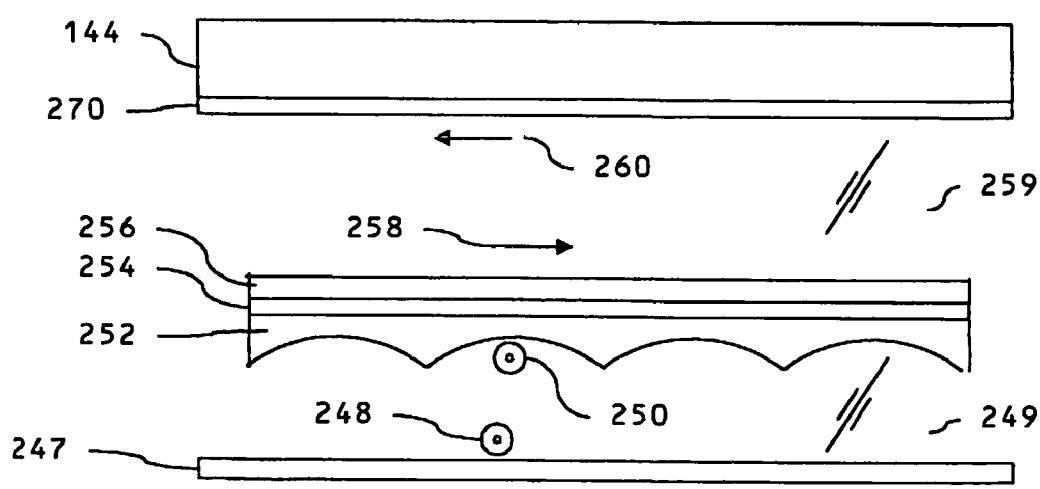

The lens array structure of FIG. 15 may be manufactured for example as shown in FIG. 17. In FIG. 17a, the substrate 247 has an alignment layer which may be a rubbed polyimide alignment layer, a photo-alignment layer or a diffractive alignment layer for example. A layer of curable birefringent material 249 such as RM257 available from Merck is applied to the surface of the substrate 247 and an embossing tool 262 comprising a surface relief layer with an alignment layer 264 (which may be a diffractive alignment layer) is applied to the surface of the material 249 to form the lenses with appropriate material alignment direction. An ultra-violet source (not shown) is applied to the material so that it is cured in this structure.

In FIG. 17b, an isotropic material such as a UV curable polymer is applied to the top of the first lens array, and embossed by a tool 266 with a second surface relief and alignment layer structure 268. Again the material is UV cured. Alternatively, the alignment layer can be applied subsequent to processing for example a coated polyimide layer which is subsequently rubbed. Finally, the structure is assembled by adding an outer substrate 144 with alignment layer 270 and filling the gap with birefringent material such as a liquid crystal or a curable liquid crystal material. The substrate 144 may be omitted if an embossing tool with alignment layer (not shown) is used in the manner described in FIGS. 17a and 17b.

To fabricate the structure shown in FIG. 14, non-replicated alignment layers can be used on replicated isotropic surfaces 224 and 234. A layer such as a glass Microsheet layer with alignment layers can be sandwiched between the lens surfaces by means of spacers, and the gaps filled with appropriate birefringent materials which may be UV curable liquid crystal materials.

In these configurations, the first and second birefringent layers and first and second isotropic layers may be of different materials in order to separately optimise the design of the system.

FIG. 22 shows further lens array structure. It differs from the lens array structure of FIG. 14 in that substrates 228 and 230 are eliminated, and one of the isotropic lens substrates, for example 290 is constructed from a material, typically a plastics material with refractive index substantially the same as the extraordinary refractive index of the birefringent material 226. A birefringent material 288 is used to fill the gap between the two lens surfaces 224, 290. The other lens substrate 224 is constructed from a plastics material with a refractive index substantially the same as the ordinary refractive index of the birefringent material 226. The birefringent material 288 takes up an orientation controlled by the alignment directions 236 and 242 at the surfaces of the lenses, namely a twisted configuration. Light polarized as indicated by the arrow 244 enters the device and sees lens 224 as there is a refractive index step from the lens to the birefringent material 226 for that polarization. The light is then rotated through the birefringent material, and when it emerges at the interface of the lens substrate 290 it does not see a refractive index step as 290 is made of a material with a refractive index substantially the same as the extraordinary refractive index of the birefringent material 226. Conversely when light entering the device is polarized in direction indicated by arrow 246, no refractive index step is seen at element 224, the light is however still rotated by the birefringent material 226 and impinges on lens substrate 290 with a polarization orthogonal to direction 242 and therefore does see a refractive index step at this interface. Therefore by selecting the output polarization from the device by means of a polarization switch as described in WO-03/015, 424, the optical function of either lens 224 or 290 may be selected.

The embodiment of FIG. 23 differs from that of FIG. 22 in that transparent electrodes 292,294 are provide for example at each of substrates 224 and 290. Such electrodes may be for example ITO coatings applied to either surface of the respective substrates so as to enable an electric field to be established across the birefringent material 226. A switchable electrical drive 298 and contact to the electrodes 292,294 is provided. In operation in an unswitched state, the light with polarisation 244 sees the first lens function, but is guided through the cell to the second lens where an index match means that no lens function is seen. In a switched mode, the molecules of the birefringent material 288 are aligned perpendicular to the substrates so that for the polarisation state 244 the first lens is index matched while the second lens sees a refractive index step at the interface and so a lens function is produced.

Figure 18:
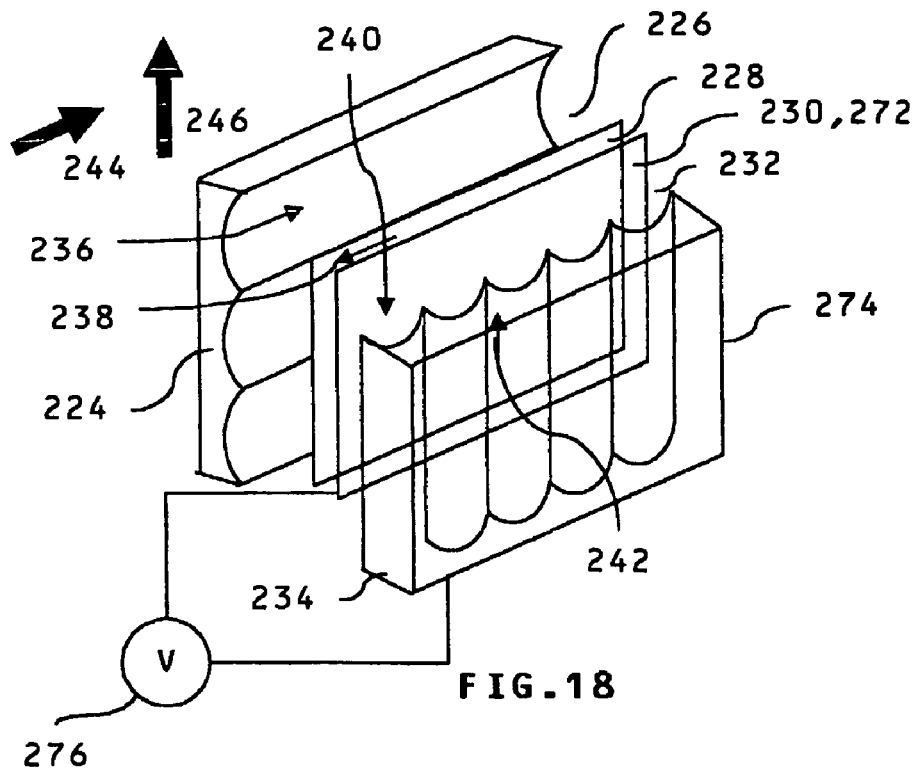
FIG. 18 shows an embodiment of the invention in which a non directional mode and two different directional modes are produced using a single active lens.

The structures described so far allow switching between two directional modes of operation. It is often desirable that the display has a third substantially non-directional mode. One lens array structure which achieves this purpose is shown in FIG. 18. The device is configured with a structure similar to that shown in FIG. 14, comprising two outer surface relief structures. The second lens is an active lens comprising a switchable nematic liquid crystal material, electrodes 272 and 274 and a switchable electrical driver 276 to apply an electric field across the cell as required.

In a first mode of operation, no field is applied to the second lens cell, so the device operates as described for FIG. 14, with the final output polarisation selection controlling which of the two lens structures has an optical function. The alignment directions 240,242 of the liquid crystal material are substantially homogeneous.

Figure 19:
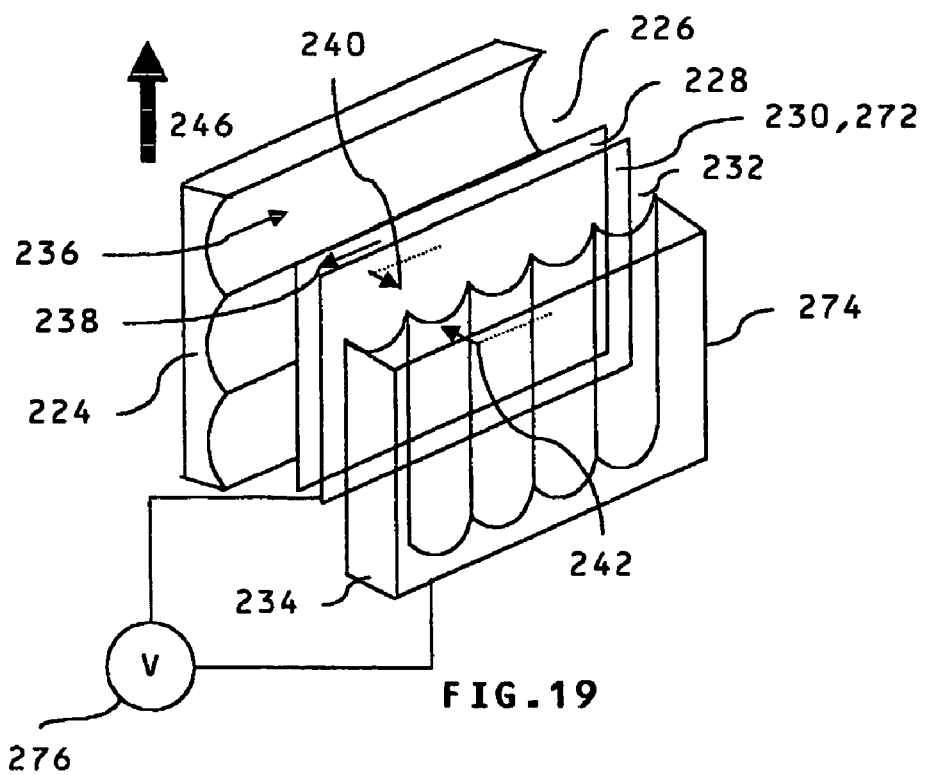
FIG. 19 shows the generation of the non-directional mode in the display of FIG. 18.

To generate a non-directional mode, the device is configured as shown in FIG. 19. The polarisation state 246 passes through the first lens, which has no optical effect. An electric field is applied across the cell by the driver 276, so that the liquid crystal director alignment directions 240,242 are aligned substantially normal to the surface of the lenses. Thus, the polarisation state sees the ordinary refractive index of the liquid crystal material at the surface relief structure, and so the device is index matched and has no optical function. Thus, a non-directional mode is produced.

Figure 20:
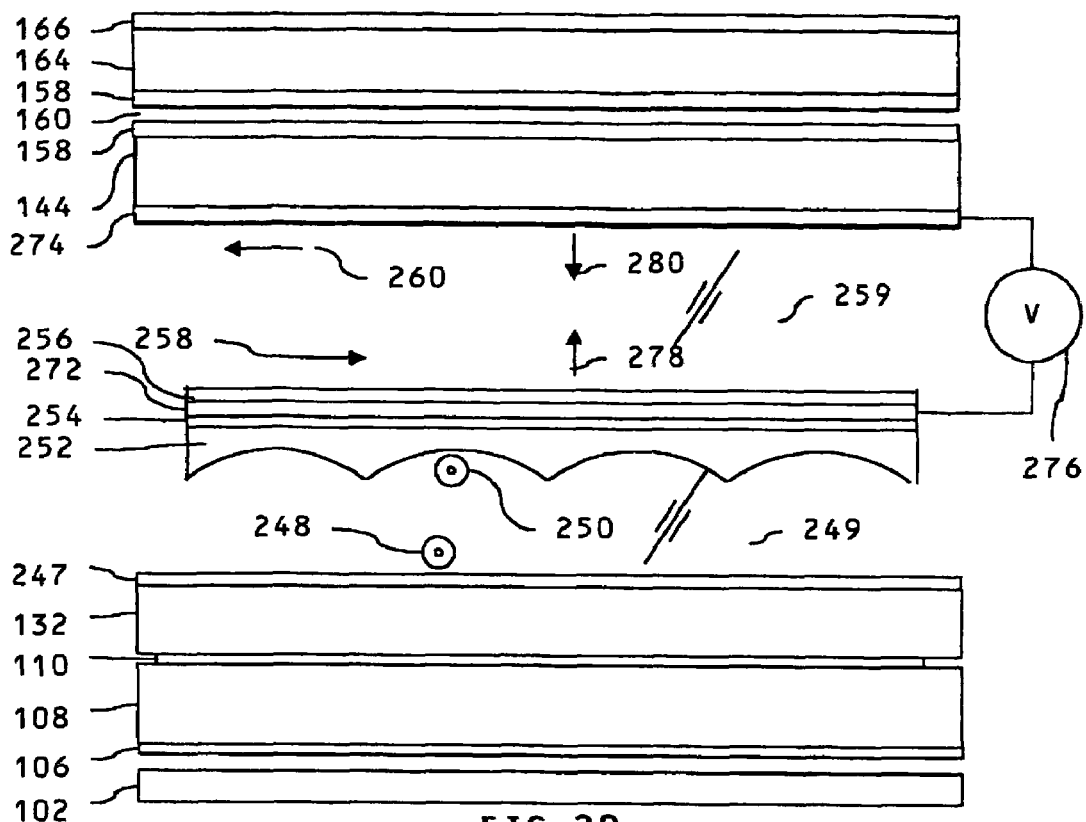
FIG. 20 shows the structure of a display incorporating the lenses of FIG. 18.

An example device structure is shown in cross section in FIG. 20, which is similar to FIG. 15, except that electrodes 272,274 and drive circuit 276 are inserted, and the liquid crystal material 259 is for example a switchable nematic liquid crystal. The birefringent material 249 may be a cured liquid crystal for example. The unswitched liquid crystal alignment 258,260 may be homogeneous while the switched state alignments 280, 278 may be homeotropic.

An alternative structure is shown in FIG. 21 in which a single input polarisation state is used, and both lenses comprise active lenses, so that additional electrodes 282,284 and drive circuit 286 are incorporated. In a non-directional mode both lenses are activated so that the directors are normal to the surfaces and the incident polarisation state is index matched for both lenses. To activate the first lens, the driver 286 is switched off so that there is an index step at the first refractive surface due to the alignment direction 236. Disadvantageously, the alignment direction is orthogonal to the geometric lens axis, so that disclinations may be present in the cell.

In the third mode, in which the second lens function is activated, then the driver 286 is activated and the driver 276 is deactivated. To activate both lenses simultaneously, both lenses are switched off, so that there is an index step at both surfaces.

The relative position of the active and passive lenses can be reversed, so as to optimise device performance.

The polarisation switch cell in single active lens configurations can be placed between a panel output polariser and the lens cells, similar to the structure of FIG. 9 for example.

In this manner, a display which can be switched between a substantially non-directional mode and two different directional modes can be produced. The directional modes may be a combination of autostereoscopic landscape mode, autostereoscopic portrait mode, two view autostereoscopic mode, multi-view autostereoscopic mode, tilted lens autostereoscopic mode, enhanced brightness mode or multi-viewer mode.

The birefringent nematic liquid crystal material in the embodiments of the invention may contain a percentage of curable liquid crystal material, for example RM257 (Merck Ltd.), so as to form a liquid crystal gel or polymer nematic composite as is known in the art. The LC gel may be polymerised similarly to the curable liquid crystal materials as described before. Advantageously the LC gel may help stabilise the mechanical properties of the nematic LC cell making it more robust to mechanical pressure for example. The LC gel may be used in either active or passive implementations of the invention, the drive voltage may be increased in the LC gel compared to the pure liquid crystal case. In the passive lens implementations with liquid crystal, LC gel or curable liquid crystal, no drive voltage is required for operation.

The invention claimed is:

1. A lens array structure comprising a first birefringent lens array and a second birefringent lens array arranged in series, wherein
    both the first birefringent lens array and the second birefringent lens array are capable of operating to direct incident light of one polarisation into a respective directional distribution and to have substantially no effect on incident light of a polarisation perpendicular to said one polarisation,
    the first birefringent lens array and the second birefringent lens array are relatively oriented such that incident light of a first polarisation component is directed into a directional distribution by the first birefringent lens array and not affected by the second birefringent lens array whereas incident light of a second polarisation component polarised in a direction perpendicular to said first polarisation component is not affected by the first birefringent lens array and directed into a predetermined directional distribution by the second birefringent lens array, and
    at least one of the first birefringent lens array and the second birefringent lens array is an active lens array switchable between a first mode in which the active lens array directs incident light of one polarisation into a respective directional distribution and has substantially no effect on incident light of a polarisation perpendicular to said one polarisation and a second mode in which the active lens array has substantially no optical effect.

2. A lens array structure according to claim 1, wherein the first birefringent lens array and the second birefringent lens array are cylindrical lens arrays.

3. A lens array structure according to claim 1, wherein the first birefringent lens array and the second birefringent lens array each comprise a birefringent material and an isotropic material having a curved surface therebetween.

4. A lens array structure according to claim 3, wherein the birefringent materials of the first and second birefringent lens arrays have the same ordinary and extraordinary refractive indices, the ordinary axes of the birefringent materials of the first and second birefringent lens arrays are oriented in directions corresponding to said first polarisation component and said second polarisation component, respectively, and the isotropic material of both the first and second birefringent lens arrays have the same refractive index equal to one of the ordinary and extraordinary refractive indices of the birefringent material of the first and second birefringent lens arrays.

5. A lens array structure according to claim 3, wherein the birefringent materials of the first and second birefringent lens arrays have the same ordinary and extraordinary refractive indices, and the isotropic material of one of the first and second birefringent lens arrays has a refractive index equal to the ordinary refractive index of the birefringent material and the other of the first and second birefringent lens arrays has a refractive index equal to the extraordinary refractive index of the birefringent material.

6. A lens array structure according to claim 5, wherein the first birefringent lens array and the second birefringent lens array comprise common birefringent material.

7. A lens array structure according to claim 3, wherein the ordinary axes of the birefringent materials of the first and second birefringent lens arrays are oriented in directions corresponding to said first polarisation component and said second polarisation component, respectively, the first isotropic material has a refractive index equal to one of the ordinary and extraordinary refractive indices of the first birefringent material; and the second isotropic material has a same refractive index equal to one of the ordinary and extraordinary refractive indices of the second birefringent material.

8. A display apparatus comprising:

a spatial light modulator;

a lens array structure comprising a first birefringent lens array and a second birefringent lens array arranged in series, wherein both the first birefringent lens array and the second birefringent lens array are capable of operating to direct incident light of one polarisation into a respective directional distribution and to have substantially no effect on incident light of a polarisation perpendicular to said one polarisation, wherein the first birefringent lens array and the second bireflingent lens array are relatively oriented such that incident light of a first polarisation component is directed into a directional distribution by the first birefringent lens array and not affected by the second birefringent lens array whereas incident light of a second polarisation component polarised in a direction perpendicular to said first polarisation component is not affected by the first birefringent lens array and directed into a predetermined directional distribution by the second birefringent lens array, and wherein at least one of the first birefringent lens array and the second birefringent lens array is an active lens array switchable between a first mode in which the active lens array directs incident light of one polarisation into a respective directional distribution and has substantially no effect on incident light of a polarisation perpendicular to said one polarisation and a second mode in which the active lens array has substantially no optical effect;

a switchable polarisation control device arranged to control the polarisation of light passing through the display apparatus to output from the display apparatus light of a polarisation component selectively corresponding to either said first polarisation component or said second polarisation component; and a control circuit arranged to control switching of the at least one active lens array.

9. A display apparatus according to claim 8, wherein the switchable polarisation control device comprises a switchable polariser arranged to pass light having a polarisation component selectively corresponding to either said first polarisation component or said second polarisation component.

10. A display apparatus according to claim 8, wherein the switchable polarisation control device comprises a switchable polarisation rotator.

11. A display apparatus according to claim 10, wherein the spatial light modulator is arranged to output substantially polarised light and the switchable polarisation rotator is arranged between the spatial light modulator and the lens array structure.

12. A display apparatus according to claim 10, wherein the spatial light modulator is arranged to output substantially polarised light and the display apparatus further comprises a linear polariser arranged on an output side of the switchable polarisation rotator.

* * * * *